(12) United States Patent
Nonaka et al.

(10) Patent No.: US 9,954,957 B2
(45) Date of Patent: Apr. 24, 2018

(54) TERMINAL CONTROL METHOD, TERMINAL CONTROL SYSTEM, AND SERVER DEVICE

(71) Applicant: Panasonic Intellectual Property Corporation of America, Torrance, CA (US)

(72) Inventors: Masao Nonaka, Osaka (JP); Toshihisa Nakano, Osaka (JP); Ryota Miyazaki, Osaka (JP); Motoji Ohmori, Osaka (JP); Masayuki Kozuka, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 357 days.

(21) Appl. No.: 14/039,971

(22) Filed: Sep. 27, 2013

(65) Prior Publication Data

US 2014/0095684 A1 Apr. 3, 2014

Related U.S. Application Data

(60) Provisional application No. 61/707,253, filed on Sep. 28, 2012.

(51) Int. Cl.
*G06F 15/173* (2006.01)
*H04L 29/08* (2006.01)
*H04L 12/28* (2006.01)

(52) U.S. Cl.
CPC .......... *H04L 67/16* (2013.01); *H04L 12/2818* (2013.01); *H04L 12/2825* (2013.01); *H04L 2012/285* (2013.01); *H04L 2012/2849* (2013.01)

(58) Field of Classification Search
CPC ............. H04L 12/2818; H04L 12/2825; H04L 2012/2849; H04L 2012/285; H04L 67/16
USPC .......................... 709/217, 218, 223, 224, 229
See application file for complete search history.

(56) References Cited

U.S. PATENT DOCUMENTS

| | | | | |
|---|---|---|---|---|
| 7,627,689 B2 * | 12/2009 | Takahashi | ............... | H04L 29/06 709/224 |
| 9,241,028 B2 * | 1/2016 | Dixon | ................. | H04L 12/2827 |
| 2004/0024912 A1 * | 2/2004 | Fukao | ..................... | H04L 29/06 709/249 |

(Continued)

FOREIGN PATENT DOCUMENTS

| | | | |
|---|---|---|---|
| JP | 2002-85886 | | 3/2002 |
| JP | WO2011030200 | * | 3/2011 |

*Primary Examiner* — Liangche A Wang
(74) *Attorney, Agent, or Firm* — Wenderoth, Lind & Ponack, L.L.P.

(57) ABSTRACT

In a system that centrally manages a terminal device group composed of a plurality of terminal devices in a home, a method allows for: determining an instruction to be transmitted to one of the terminal devices according to an operation status acquired from a different one of the terminal devices; specifying, from among the terminal devices, a terminal device as a transmission destination of the instruction, with use of pieces of connection source information specifying the respective terminal devices in a network, and acquisition times of the pieces of connection source information; and transmitting the instruction to the specified terminal device. Upon receiving the instruction, the specified terminal device performs an operation based on the received instruction. The operation is in coordination with the operation status acquired from the different terminal device.

15 Claims, 19 Drawing Sheets

(56) References Cited

U.S. PATENT DOCUMENTS

| | | | | |
|---|---|---|---|---|
| 2006/0168618 | A1* | 7/2006 | Choi | G08C 17/02 725/37 |
| 2008/0079595 | A1* | 4/2008 | Baier | G05B 23/0235 340/679 |
| 2011/0317587 | A1* | 12/2011 | Lida | H04L 12/2832 370/254 |
| 2012/0316693 | A1* | 12/2012 | Ogawa | H02J 3/14 700/295 |
| 2013/0034099 | A1* | 2/2013 | Hikichi | H04L 61/2532 370/392 |
| 2013/0040576 | A1* | 2/2013 | Yoon | H04W 8/005 455/41.2 |
| 2013/0086245 | A1* | 4/2013 | Lu | G05B 13/02 709/223 |
| 2013/0179540 | A1* | 7/2013 | Isozu | H04L 67/025 709/218 |
| 2013/0179926 | A1* | 7/2013 | White | H04L 12/2809 725/59 |
| 2013/0290997 | A1* | 10/2013 | Meijer | H04N 21/442 725/14 |
| 2013/0331087 | A1* | 12/2013 | Shoemaker | H04L 67/125 455/420 |

* cited by examiner

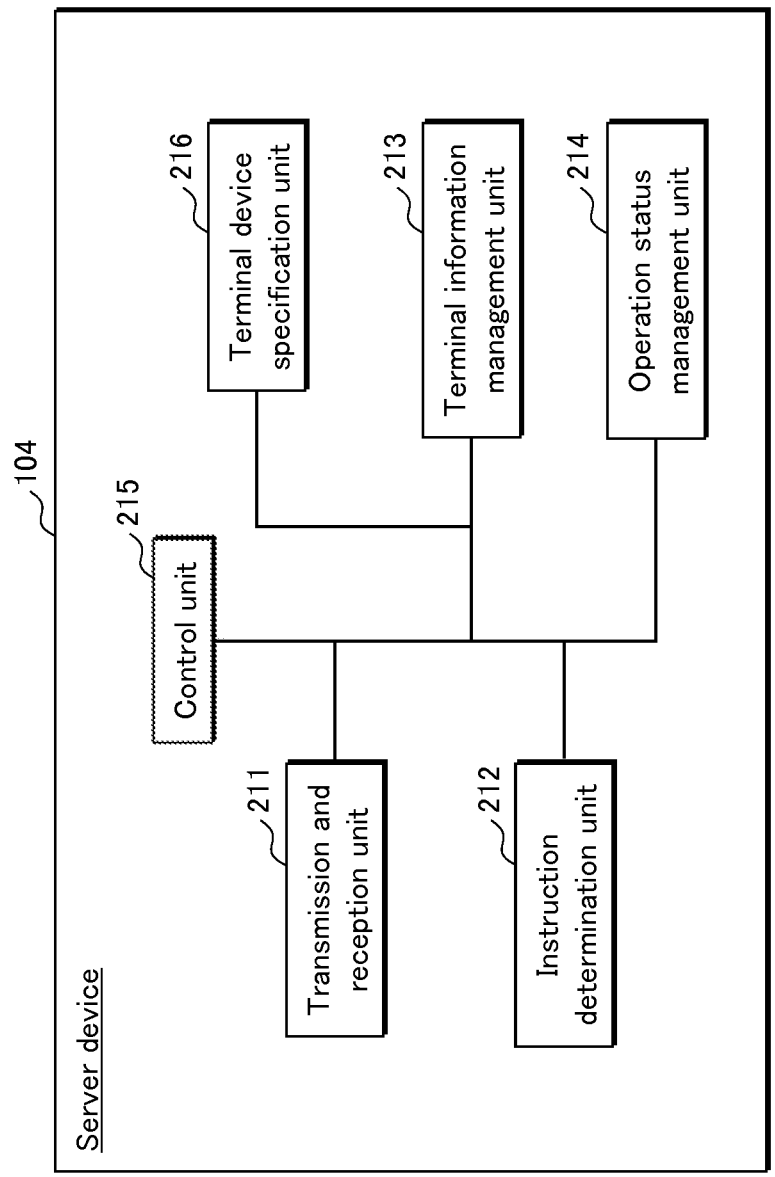

FIG.8

| | Connection information | | Terminal unique information | | Operation status |
|---|---|---|---|---|---|
| | Connection source IP address | Connection time | Terminal ID | Product code | |
| R1 | 1.2.3.4 | 2012/9/26 21:33:50 | 12345678 | AIRCON2011 | Power on |
| R2 | 1.2.3.4 | 2012/9/26 22:35:40 | 12345678 | AIRCON2011 | Temperature setting change |
| R3 | 1.2.3.4 | 2012/9/26 23:31:10 | 12345678 | AIRCON2011 | Mode change (dehumidify) |
| R4 | 1.2.5.6 | 2012/9/27 0:25:10 | 12345678 | AIRCON2011 | Power off |
| | ... | ... | ... | ... | ... |
| R11 | 1.2.3.4 | 2012/9/26 21:37:50 | 13572468 | PANEL2012 | Power consumption 85% |
| R12 | 1.2.3.4 | 2012/9/26 22:41:00 | 13572468 | PANEL2012 | Power consumption 68% |
| R13 | 1.2.3.4 | 2012/9/26 23:36:10 | 13572468 | PANEL2012 | Power consumption 55% |
| R14 | 1.2.5.6 | 2012/9/27 0:27:10 | 13572468 | PANEL2012 | Power consumption 25% |
| | ... | ... | ... | ... | ... |
| R21 | 1.2.3.4 | 2012/9/26 21:35:50 | 98765432 | IHCH2010 | Power on, heating power 5 |
| R22 | 1.2.3.4 | 2012/9/26 22:39:20 | 98765432 | IHCH2010 | Power on, heating power 2 |
| R23 | 1.2.3.4 | 2012/9/26 23:34:10 | 98765432 | IHCH2010 | Power on, heating power 3 |
| R24 | 1.2.5.6 | 2012/9/27 0:22:10 | 98765432 | IHCH2010 | Power off |
| | ... | ... | ... | ... | ... |

FIG.10

| | Received information | | Transmission instruction | | | |
|---|---|---|---|---|---|---|
| | Terminal device | Operation status | Terminal device | Operation status | Instruction | Priority |
| RULE1 | Distribution board | Power consumption is greater than or equal to 80% of allowable amount | IH cooking heater | At least one burner is in operation | Reduce heating power | 1 |
| | | | LED light | Illuminance setting is "high" | Change illuminance setting to "low" | 2 |
| | | | Television receiver | Screen brightness is "bright" | Change brightness to "dark" | 3 |
| | | | Dishwasher | In drying operation | Suspend drying operation | 4 |
| | | | Electric kettle | Operation mode is set to maintaining heat at 98 °C | Change operation mode to maintaining heat at 60 °C | 5 |
| RULE2 | Air conditioner | Humidity is greater than or equal to 70% | Washing machine | Operation mode is washing only | Change operation mode to washing + drying | 1 |
| RULE3 | BD recorder | Movie disc is inserted | LED light | Illuminance setting is other than "low" | Change illuminance setting to "low" | 1 |

| | Connection information | | Terminal unique information | | Operation status |
|---|---|---|---|---|---|
| | Connection source IP address | Connection time | Terminal ID | Product code | |
| R31 | 1.2.3.4 | 2012/9/26 21:33:50 | 12345678 | AIRCON2012 | Power on |
| R32 | 1.2.3.4 | 2012/9/26 22:35:40 | 12345678 | AIRCON2012 | Temperature setting change |
| R33 | 1.2.3.4 | 2012/9/26 23:31:10 | 12345678 | AIRCON2012 | Mode change (dehumidify) |
| R34 | 1.2.5.6 | 2012/9/27 0:25:10 | 12345678 | AIRCON2012 | Power off |
| R35 | 1.2.5.6 | 2012/9/28 6:40:20 | 12345678 | AIRCON2012 | Power on |
| | ... | ... | ... | ... | ... |
| R41 | 3.4.5.6 | 2012/9/26 21:33:50 | 98765432 | WASHER2010 | Power off |
| R42 | 3.4.5.6 | 2012/9/26 22:35:40 | 98765432 | WASHER2010 | Power off |
| R43 | 8.9.0.1 | 2012/9/26 23:31:10 | 98765432 | WASHER2010 | Power off |
| R44 | 8.9.0.1 | 2012/9/27 0:25:10 | 98765432 | WASHER2010 | Power off |
| | ... | ... | ... | ... | ... |
| R51 | 1.2.3.4 | 2012/9/26 21:35:50 | 5678 | CELLPHONE | Air conditioner on |
| R52 | 100.99.8.4 | 2012/9/28 10:10:40 | 5678 | CELLPHONE | Air conditioner off |

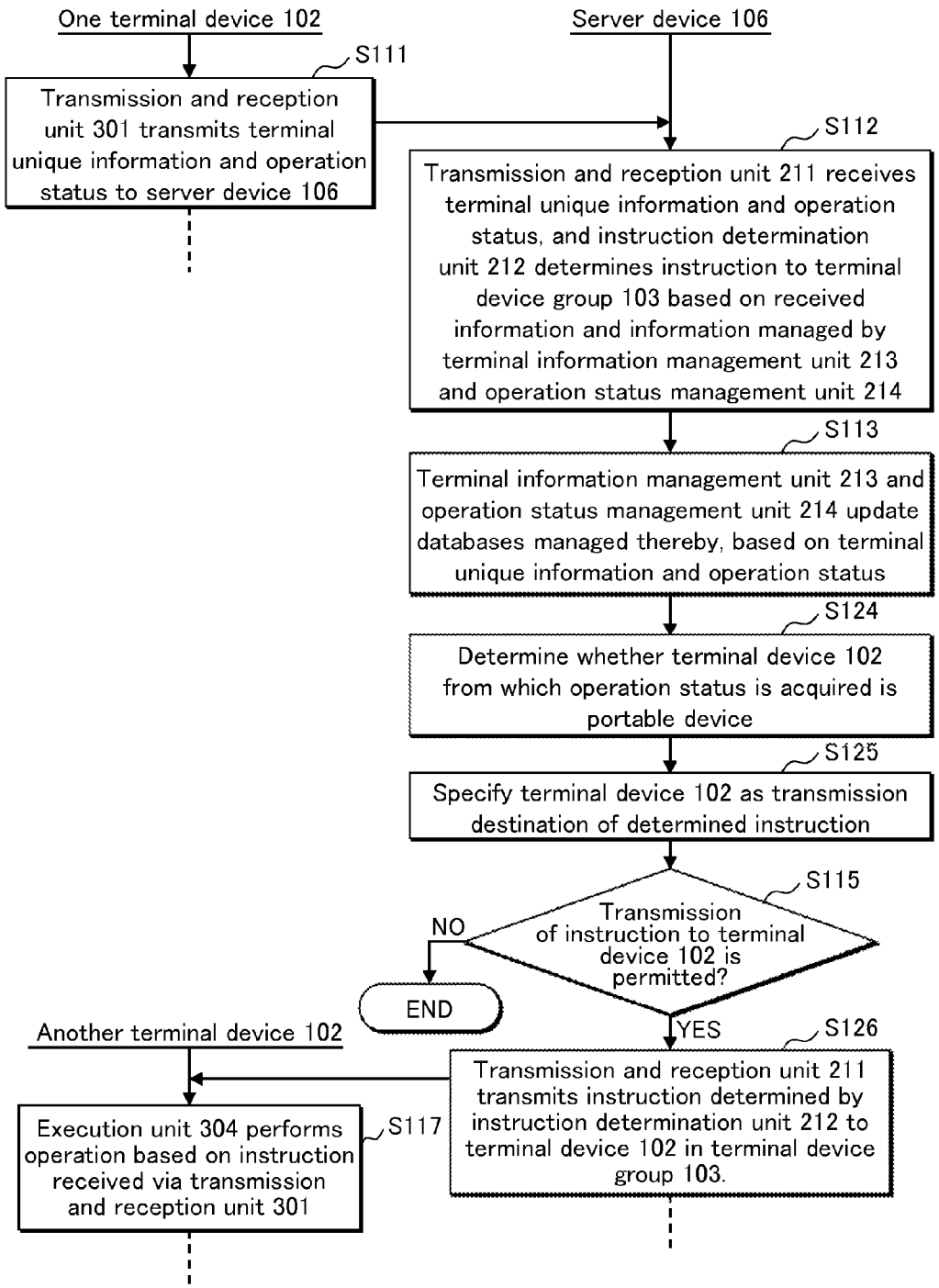

FIG.18

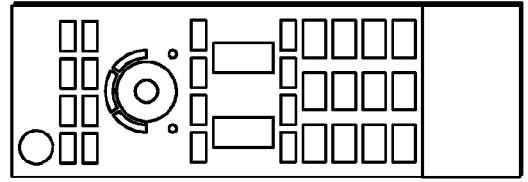

A mobile telephone (terminal ID: 5678) gave a power on instruction to an air conditioner (terminal ID: 12345678) at 21:34, September 26, 2012.

Did you give this instruction?

When "Yes" is pressed, an instruction from the mobile telephone to the air conditioner is accepted unconditionally from now on. When "this time only" is pressed, the current instruction is executed. If the mobile telephone gives another instruction to the air conditioner in the future, this message will be shown again.

If you do not recognize this instruction, please select "No".

Yes | This time only | No

FIG.19

| Terminal unique information | | Polling interval (Average interval when power is on) |
|---|---|---|
| Terminal ID | Product code | |
| 12345678 | AIRCON2012 | 30.0 |
| 98765432 | IHCH2010 | 61.2 |
| ... | ... | ... |

TERMINAL CONTROL METHOD, TERMINAL CONTROL SYSTEM, AND SERVER DEVICE

CROSS REFERENCE TO RELATED APPLICATION

This application claims benefit to the U.S. provisional Application 61/707,253 filed on Sep. 28, 2012.

TECHNICAL FIELD

The present disclosure relates to a terminal control system for controlling a terminal device group composed of a plurality of terminal devices in a home by connecting the terminal device group to a server device via the Internet. In particular, the present disclosure relates to a terminal control system for centrally managing and safely, conveniently controlling a user-owned terminal device group.

DESCRIPTION OF THE RELATED ART

Along with the spread of information processing terminals, many electric household appliances are now provided with a network connecting function. As a result, an external device can control a terminal device such as an electric household appliance or an information processing terminal via a network.

Examples of such control with respect to a terminal device include a remote operation from outside a home and a program update. Specifically, in the case of a recorder for recording broadcast programs onto a hard disk drive, a mobile telephone or a computer outside a home can be used to set the recorder to record a program. Another example is that a smartphone can download and install an update program from a server device via the Internet so as to resolve malfunctions in the original program or to add a new function.

Patent Literature 1 discloses a system including laundry equipment, a home terminal connected to the laundry equipment via a network, and an external server device. The system gathers data related to the laundry equipment usage, and transmits necessary information to intended laundry equipment. This reduces the labor required to re-input location information and user preference data when new laundry equipment is purchased to replace existing laundry equipment.

Meanwhile, there is a conventional control method in which a terminal device is directly connected to a different terminal device in a home and is operated according to the operation status of the different terminal device. One example of such control is that when a disc is inserted into a BD (Blu-ray Disc) recorder connected to a television receiver via an HDMI (High Definition Multimedia Interface), the BD recorder instructs the television receiver to switch a video input source to an external input, so that playback images on the disc is displayed on the television receiver.

CITATION LIST

Patent Literature

[Patent Literature 1] Japanese Patent Application Publication No. 2002-85886

SUMMARY

However, the following problem arises when an attempt is made such that a terminal device is caused to operate according to the operation status of a different terminal device in the same home. Suppose that terminal devices in the same home are directly connected to each other, and that one of the terminal devices, which serves as a control source device, attempts to control a given terminal device among the terminal devices. In such a case, the control source device needs to manage all the functions and operation status of the given terminal device. This causes control of the terminal devices complicated, and naturally, the control source device cannot control the other terminal devices not intended for control.

On the other hand, suppose that an external device is used to control a terminal device as disclosed in Patent Literature 1. In this case, it suffices for the external device to control all terminal devices, and the terminal devices do not need a function of controlling another terminal device. In this case, however, the external device may control a terminal device in a home according to the operation status of a terminal device in a different home, causing inconvenience to the users of the respective terminal devices.

One non-limiting and exemplary embodiment provides a terminal control method, a terminal control system, and a server device. The terminal control method is used in the terminal control system. The terminal control system acquires the operation status of a terminal device that serves as a control source device, specifying a different terminal device in the same home as the control source device, and causes the different terminal device to perform an operation according to the operation status of the control source device.

In view of the conventional problems described above, one aspect of the present disclosure is a terminal device controlling method used in a system that centrally manages and controls, via a network, a terminal device group composed of a plurality of terminal devices in a home, the system including an information acquisition unit, an information management unit, an instruction determination unit, a terminal device specification unit, and an instruction transmission unit, the controlling method comprising: an information acquisition step, by the information acquisition unit, of acquiring, from each of the terminal devices, an operation status and terminal unique information identifying the terminal device; an information management step, by the information management unit, of managing, for each of the terminal devices, the operation status, the terminal unique information, connection source information, and acquisition time in association with each other, the connection source information specifying, in the network, the terminal device from which the operation status and the terminal unique information have been acquired, and the acquisition time indicating time at which the operation status and the terminal unique information have been acquired; an instruction determination step, by the instruction determination unit, of determining an instruction for causing one of the terminal devices to perform an operation according to the operation status acquired from a different one of the terminal devices; a terminal device specification step, by the terminal device specification unit, of specifying, from among the terminal devices, a terminal device as a transmission destination of the instruction, the terminal device being identified by the terminal unique information corresponding to the same connection source information as the connection source information that is associated with the operation status acquired from the different terminal device, and that has been acquired within a predetermined time period before and after the acquisition time associated with the operation status acquired from the different terminal device; and an instruction transmission step, by the instruction transmission unit, of transmitting the instruction to the specified terminal device.

The controlling method of the present disclosure realizes a terminal control system having the following functions: manage a terminal device group composed of a plurality of terminal devices in a home; acquire an operation status from one of the terminal devices; specify a different one of the terminal devices in the same home; and cause the different terminal device thus specified to perform an operation according to the operation status acquired from the one terminal device.

These general and specific aspects may be implemented using a device.

Additional benefits and advantages of the disclosed embodiments will be apparent from the specification and figures. These benefits and/or advantages may be individually provided by the various embodiments and features disclosed in the specification and figures, and need not all be provided by each of the individual embodiments and features.

BRIEF DESCRIPTION OF DRAWINGS

FIG. 7 shows the structure of a server device according to Embodiment 2.

FIG. 8 shows an example of information managed by a terminal information management unit and an operation status management unit of the server device according to Embodiment 2.

FIG. 10 shows an example of coordination rules for terminal devices according to Embodiment 2.

FIG. 14 shows an example of information managed by a terminal information management unit and an operation status management unit of the server device according to Embodiment 3.

FIG. 15 is a flowchart showing a process of receiving an operation instruction according to Embodiment 3.

FIG. 18 shows an example of an operation of an inquiry regarding coordination permission according to Modification 2 of Embodiment 3.

FIG. 19 shows an example of setting a communication interval of each terminal device according to Embodiments 2 and 3.

Figure 1:
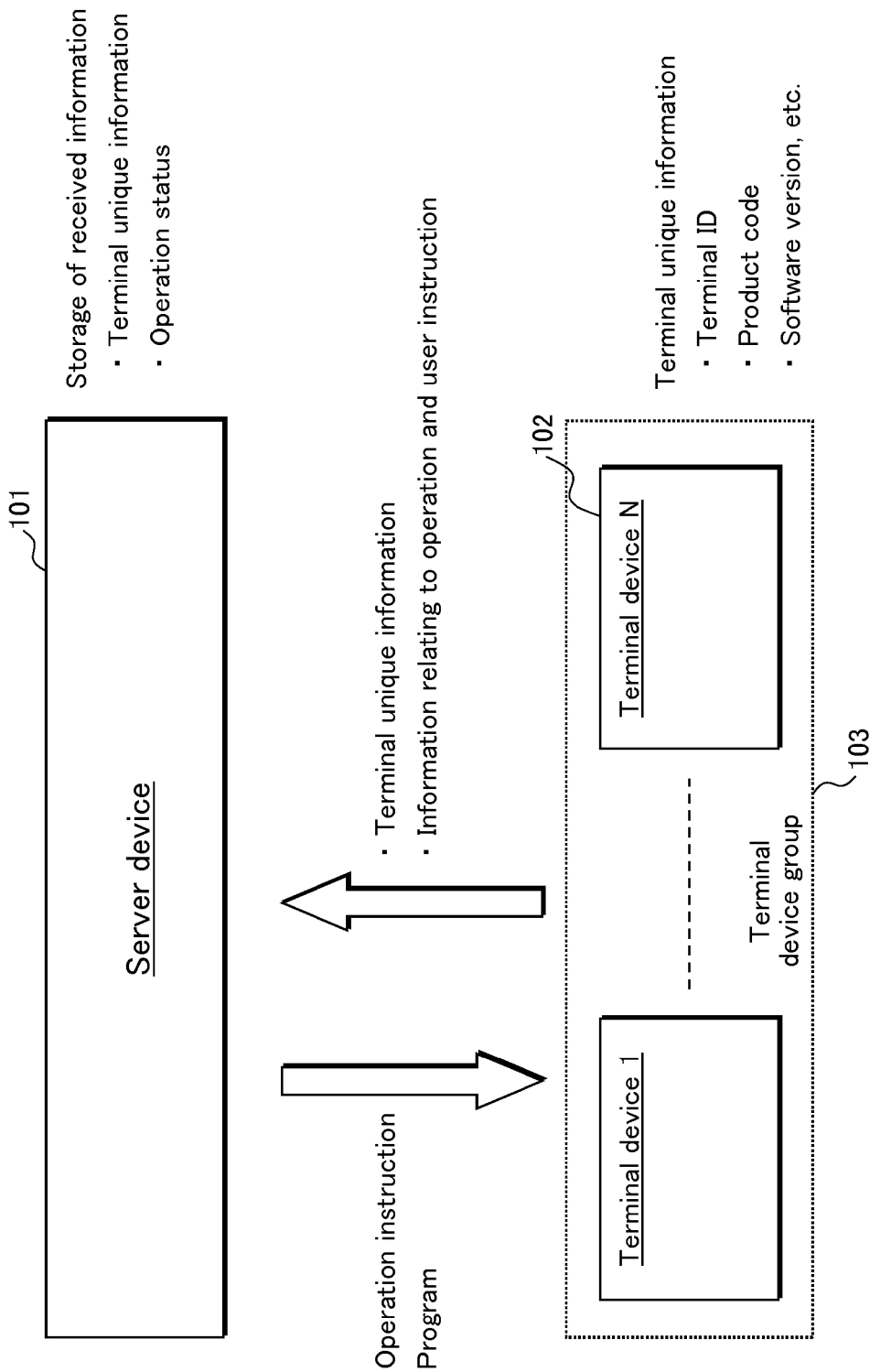
FIG. 1 shows a system structure according to Embodiment 1.

DETAILED DESCRIPTION (Process by which the Present Disclosure has been Achieved)

Suppose a case where control is performed such that a terminal device in a home, such as an electric household appliance, is caused to operate according to the operation status of another terminal device located in the same home. To perform such control, it is necessary to manage which terminal devices are located in the same home. In particular, when a terminal device is to be remotely controlled with use of a server device, the following problem arises. In a case where a home terminal is used in a home as disclosed in Patent Literature 1, a terminal device of a different home cannot be connected to the home terminal. Accordingly, it can be determined that a plurality of terminal devices connected to one home terminal are located in the same home. In this case, however, it is necessary that a home terminal is located in each home. In other words, it is necessary to provide equipment for controlling terminal devices. On the other hand, suppose that instead of a home terminal, an external server device is used to control a terminal device. In this case, it is necessary to provide the external server device with data used to determine in which home the terminal device is located. Otherwise, the external server device cannot specify which terminal device is located in the same home as the terminal device from which the operation status has been acquired.

In general, user registration data is used to determine whether terminal devices are located in the same home. That is, a user registers, with a server device, a pair of a user ID uniquely identifying the user and a terminal ID uniquely identifying a terminal device. In this way, it can be determined that terminal devices identified by the terminal IDs that each correspond to the same user ID are located in the same home. In this case, however, the user needs to go through a cumbersome preparation process when installing a new terminal device. Specifically, for example, the user needs to perform user registration every time a terminal device is newly installed in the user's home. Also, every time the user disposes a terminal device, the user needs to cancel the user registration regarding the terminal device. In particular, when registering a terminal device, such as a lighting apparatus or a refrigerator, that does not have a data input/output function or is weak in such a function, the user needs to use a device such as a personal computer or a smartphone. Also, it is often the case that such a terminal device alone cannot check whether the user registration has been completed correctly.

In view of the above problems, the present inventors focused on the fact that terminal devices such as electric household appliances are connected to a network via a household router, and arrived at the idea of determining whether the terminal devices are located in the same home, with use of connection source information indicating the source of connection. When terminal devices connect to a server device via a household router, the connection source information is not unique to each of the terminal devices, but rather unique the router and the connection time. Using the connection source information of each of the terminal devices makes it easy to determine whether the terminal devices connect to the server device via the same household router. This structure does not require any user registration data or home terminal, and enables the user to cause terminal devices to perform a coordinated operation by simply connecting the terminal devices to the same household router.

EMBODIMENTS

The following describes Embodiments of the present disclosure with reference to the figures.

Embodiment 1

1.1 Structure of Terminal Control System

As shown in FIG. 1, a terminal control system includes a server device 101 and a plurality of terminal devices 102 constituting a terminal device group 103.

The terminal device group 103 is composed of the terminal devices 102 that operate in coordination with each other. For example, the terminal devices 102 in the terminal device group 103 are provided in the same home. Alternatively, at least one of the terminal devices 102 in the terminal device group 103 may be used both inside and outside the home. Each of the terminal devices 102 in the terminal group 103 may be used by the same person or any person in a group of at least two people such as a family. The same home mentioned above may be a home of one person or a home of one family. The same home mentioned above is not necessarily a private home. For example, the same home may be a shop, a company, or an office space used by an organization, or the like.

The terminal devices 102 are either electric household appliances provided in the home or portable information terminals used both inside and outside the home. Examples of the terminal devices 102 include a television receiver, an air conditioner, a washing machine, an IH (Induction Heating) cooking heater, a microwave, and a mobile telephone.

The server device 101 manages the terminal devices 102 as the terminal device group 103. The server device 101 gathers information from each of the terminal devices 102 in the terminal device group 103, and determines the operation of at least one of the terminal devices 102 according to an operation status acquired from another one of the terminal devices 102. This realizes coordination of the terminal devices 102 in the terminal device group 103.

1.2 Structure of Server Device 101

The following describes the structure of the server device 101 in detail.

The server device 101 is a computer composed of a microprocessor, a RAM, a ROM, a hard disk, and so on. The functional blocks of the server device 101 described below are realized by the microprocessor executing computer programs stored in the RAM, the ROM, and the hard disk.

Figure 2:
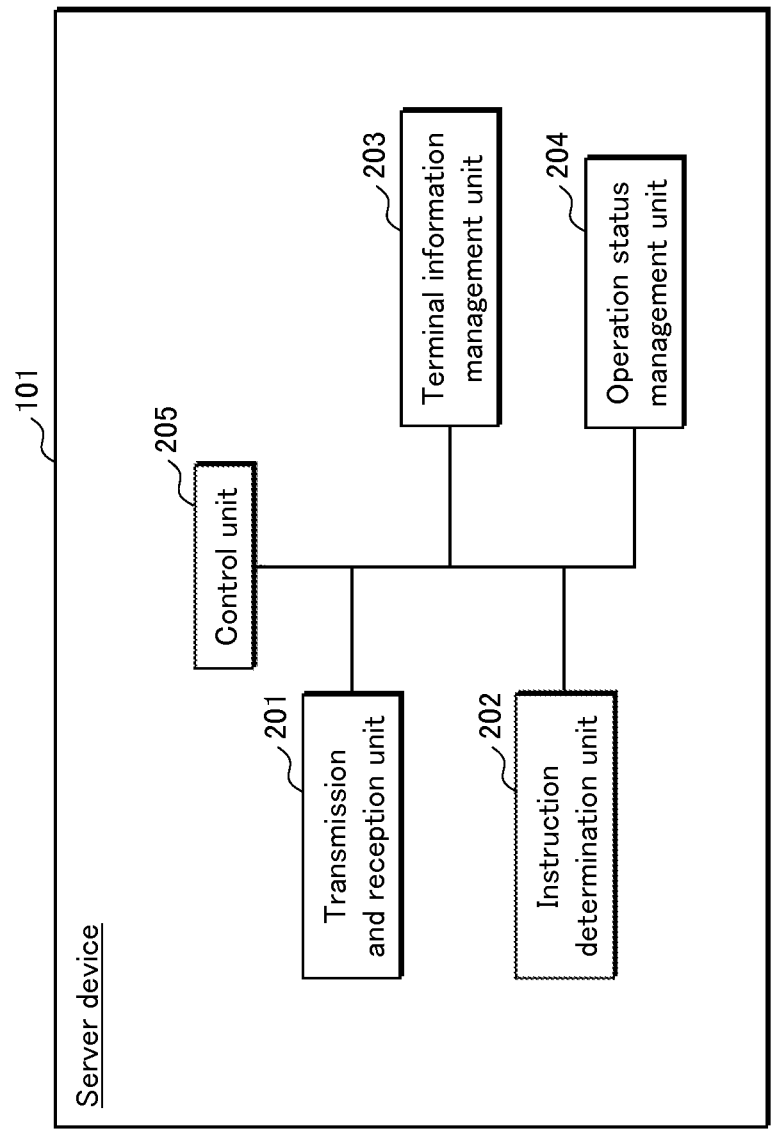
FIG. 2 shows the structure of a server device according to Embodiment 1.

As shown in FIG. 2, the server device 101 includes, as function blocks, a transmission and reception unit 201, an instruction determination unit 202, a terminal information management unit 203, an operation status management unit 204, and a control unit 205.

(1) Transmission and Reception Unit 201

The transmission and reception unit 201 is a communication unit for communicating with the terminal devices 102 via a network, and has a GbE (Gigabit Ethernet) interface, for example. The transmission and reception unit 201 receives terminal unique information and an operation status from each of the terminal devices 102. The terminal unique information includes a terminal ID uniquely identifying the terminal device 102, a product code indicating the type of the terminal device 102, and a software version indicating the version of an internal program such as firmware or middleware. The operation status is either information relating to a user operation instruction received by the terminal device 102 or information relating to an operation of the terminal device 102. The information relating to an operation of the terminal device 102 indicates either an operation detected by the terminal device 102 or an operation performed by the terminal device 102, such as the power having been switched on, a door having been opened, a warming function having been used, etc.

Also, the transmission and reception unit 201 transmits an instruction to any of the terminal devices 102. Specifically, the transmission and reception unit 201 transmits, to the terminal device 102, an operation instruction indicating that the power is to be switched on, the power-off timer is to be set, the temperature is to be adjusted, etc. Also, the transmission and reception unit 201 transmits, to any of the terminal devices 102, a program for adding a new function or correcting malfunctions. Instead of a program, the transmission and reception unit 201 may transmit an installer for installing the program, or alternatively, may transmit a downloader for acquiring the program or a URI (Uniform Resource Identifier) indicating the location of the program.

(2) Terminal Information Management Unit 203

The terminal information management unit 203 has a non-volatile recording medium such as a flash memory or a hard disk drive. The terminal information management unit 203 receives the terminal unique information of each terminal device 102 via the transmission and reception unit 201, and stores and manages the terminal unique information as a database. Also, the terminal information management unit 203 updates the database with use of the terminal unique information thus received.

(3) Operation Status Management Unit 204

The operation status management unit 204 has a non-volatile recording medium such as a flash memory or a hard disk drive. The operation status management unit 204 receives an operation status from each of the terminal devices 102 via the transmission and reception unit 201, and stores and manages the operation status as a database. Also, the operation status management unit 204 updates the database with use of the received operation status.

(4) Instruction Determination Unit 202

The instruction determination unit 202 determines an instruction to be transmitted to any of the terminal devices 102 in the terminal device group 103. Specifically, the determination is performed based on (i) either or both of the terminal unique information and the operation status received via the transmission and reception unit 201 and (ii) either or both of the database managed by the terminal information management unit 203 and the database managed by the operation status management unit 204. The instruction determination unit 202 transmits the instruction thus determined to the terminal device 102 via the transmission and reception unit 201. Note that operation instructions and programs to be transmitted are managed by being stored in a storage unit (not illustrated). Specifically, the storage unit stores code converted from instructions so as to be receivable and executable by the terminal devices 102. Such instructions include an instruction indicating that the power of an air conditioner is to be switched off and an instruction indicating that the brightness setting of a lighting device is to be "dark". Alternatively, the storage unit stores a program for installing firmware, a URI indicating the location of firmware, etc.

(5) Control Unit 205

The control unit 205 manages and controls the transmission and reception unit 201, the terminal information management unit 203, the operation status management unit 204, and the instruction determination unit 202 as described above, and thereby realizes the functions of the server device 101.

1.3 Structure of Terminal Devices 102

Figure 3:
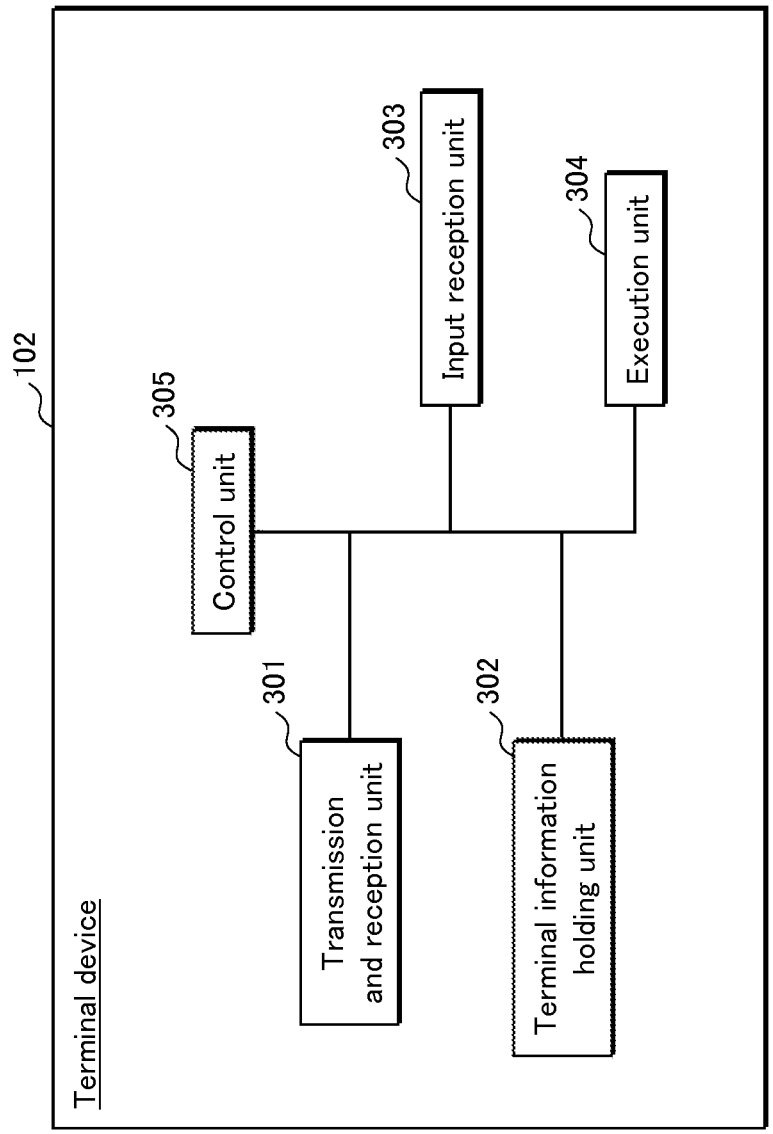
FIG. 3 shows the structure of a terminal device according to Embodiment 1.

The following describes in detail the structure of the terminal devices 102. As shown in FIG. 3, each of the terminal devices 102 includes, as function blocks, a transmission and reception unit 301, a terminal information holding unit 302, an input reception unit 303, an execution unit 304, and a control unit 305.

(1) Transmission and Reception Unit 301

The transmission and reception unit 301 is a communication unit for communicating with the server device 101 via a network, and has a GbE (Gigabit Ethernet) interface, for example.

The transmission and reception unit 301 transmits, to the server device 101, an operation status and the terminal unique information held in the terminal information holding unit 302. Also, the transmission and reception unit 301 receives an operation instruction, a program, etc., from the server device 101.

(2) Terminal Information Holding Unit 302

The terminal information holding unit 302 has a non-volatile recording medium such as a flash memory, and holds the terminal unique information of the terminal device 102 that includes a terminal ID uniquely identifying the terminal device 102, a product code indicating the type of the terminal device 102, and a software version indicating the version of an internal program such as firmware or middleware.

(3) Input Reception Unit 303

The input reception unit 303 includes a button, a touch panel, and a remote control. The input reception unit 303 receives the input of an operation instruction from a user.

(4) Execution Unit 304

The execution unit 304 is a function unit for realizing the individual functions of the terminal device 102. The execution unit 304 performs an operation based on an instruction received via the transmission and reception unit 301. If the instruction is an operation instruction, the execution unit 304 performs an operation based on the operation instruction. If the instruction is a program, the execution unit 304 performs an operation such as installation or update of the received program.

Also, the execution unit 304 performs an operation based on a user operation instruction received by the input reception unit 303.

(5) Control Unit 305

The control unit 305 includes a microprocessor and a memory, and controls the overall operations of the terminal device 102. The functions of the control unit 305 are realized by the microprocessor performing a computer program stored in the memory.

1.4 Operation of Terminal Control System

Figure 4:
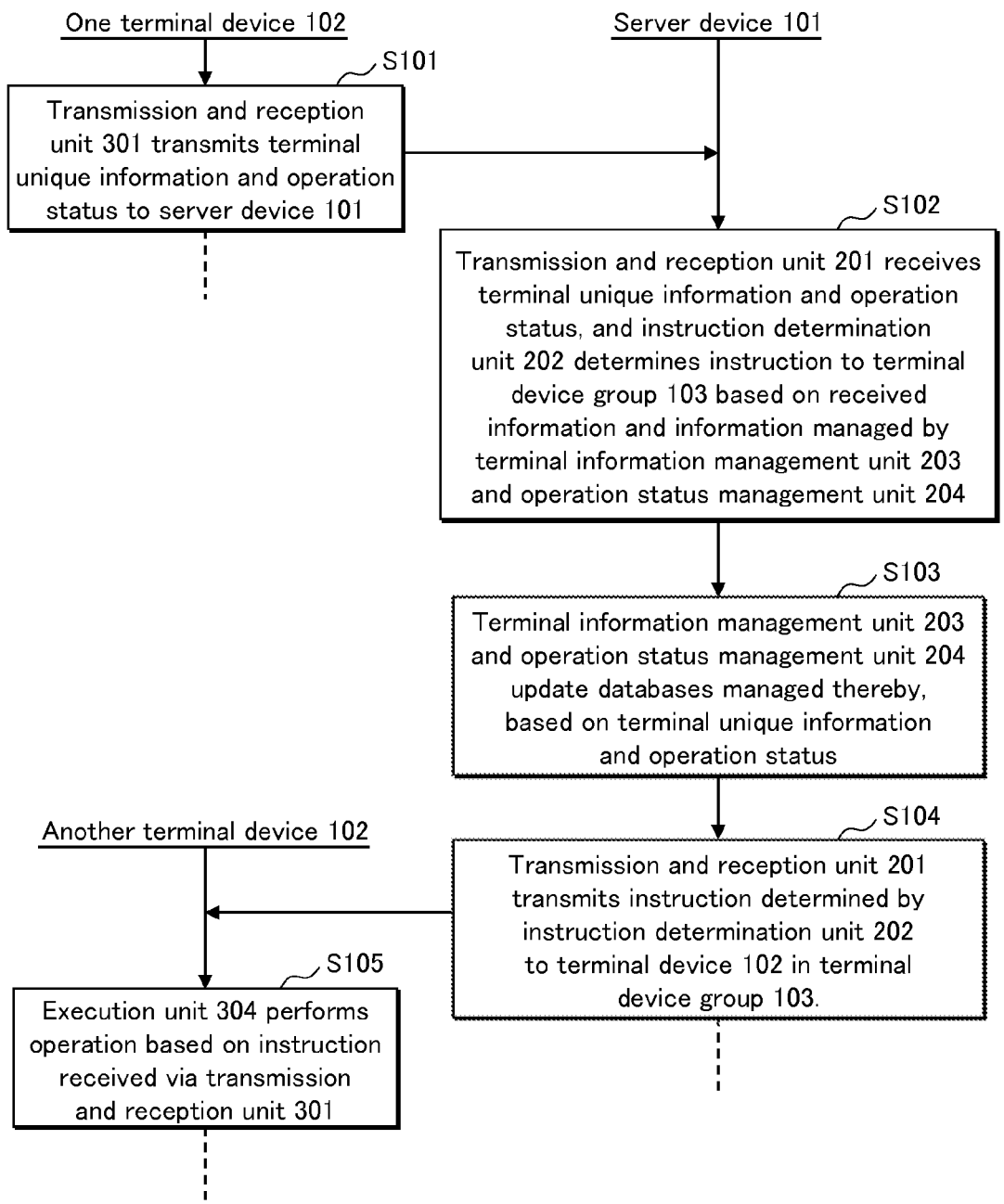
FIG. 4 is a flowchart showing a process of transmitting an operation instruction according to Embodiment 1.

The following describes an example of an operation of the server device 101 controlling the terminal devices 102, with reference to FIG. 4.

One of the terminal devices 102 transmits, to the server device 101 via the transmission and reception unit 301, the terminal unique information held in the terminal information holding unit 302 and the operation status relating to the operation performed by the execution unit 304 (step S101).

The transmission and reception unit 201 of the server device 101 receives the terminal unique information and the operation status from the terminal device 102 via the transmission and reception unit 201, and the instruction determination unit 202 determines at least one instruction to be transmitted to the terminal device group 103, based on the terminal unique information and the operation status thus received and the terminal unique information managed by the terminal information management unit 203 and the operation status managed by the operation status management unit 204 (step S102).

The terminal information management unit 203 of the server device 101 updates the database managed thereby, based on the terminal unique information received by the transmission and reception unit 201, and the operation status management unit 204 updates the database managed thereby, based on the operation status received by the transmission and reception unit 201 (step S103).

The transmission and reception unit 201 of the server device 101 transmits the instruction determined by the instruction determination unit 202 to the corresponding terminal device 102 in the terminal device group 103 (step S104).

The terminal device 102 of the terminal device group 103 receives the instruction via the transmission and reception unit 301, and the execution unit 304 of the terminal device 102 performs an operation based on the received instruction (step S105).

1.5 Summary

As described above, based on an operation performed by one of the terminal devices 102 in the terminal device group 103, or on a user instruction received by one of the terminal devices 102 in the terminal device group 103, another one of the terminal devices 102 in the same terminal device group 103 is caused to perform a coordinated operation. Accordingly, with only a function of communicating with the server device 101, each of the terminal devices 102 can perform a coordinated operation without having a function of controlling the other terminal devices 102.

Embodiment 2

In the present embodiment, a description is provided on the structure in which a server device determines an instruction to transmit to a terminal device group, based on an operation status acquired from a terminal device in the terminal device group, and specifies a terminal device to which the instruction is to be transmitted, based on terminal unique information used to determine the instruction.

Note that the same constituent elements as in Embodiment 1 are provided with the same reference signs, and the same operation steps as in Embodiment 1 are provided with the same step numbers, and the descriptions thereof are omitted.

2.1 Structure of Terminal Control System

Figure 5:
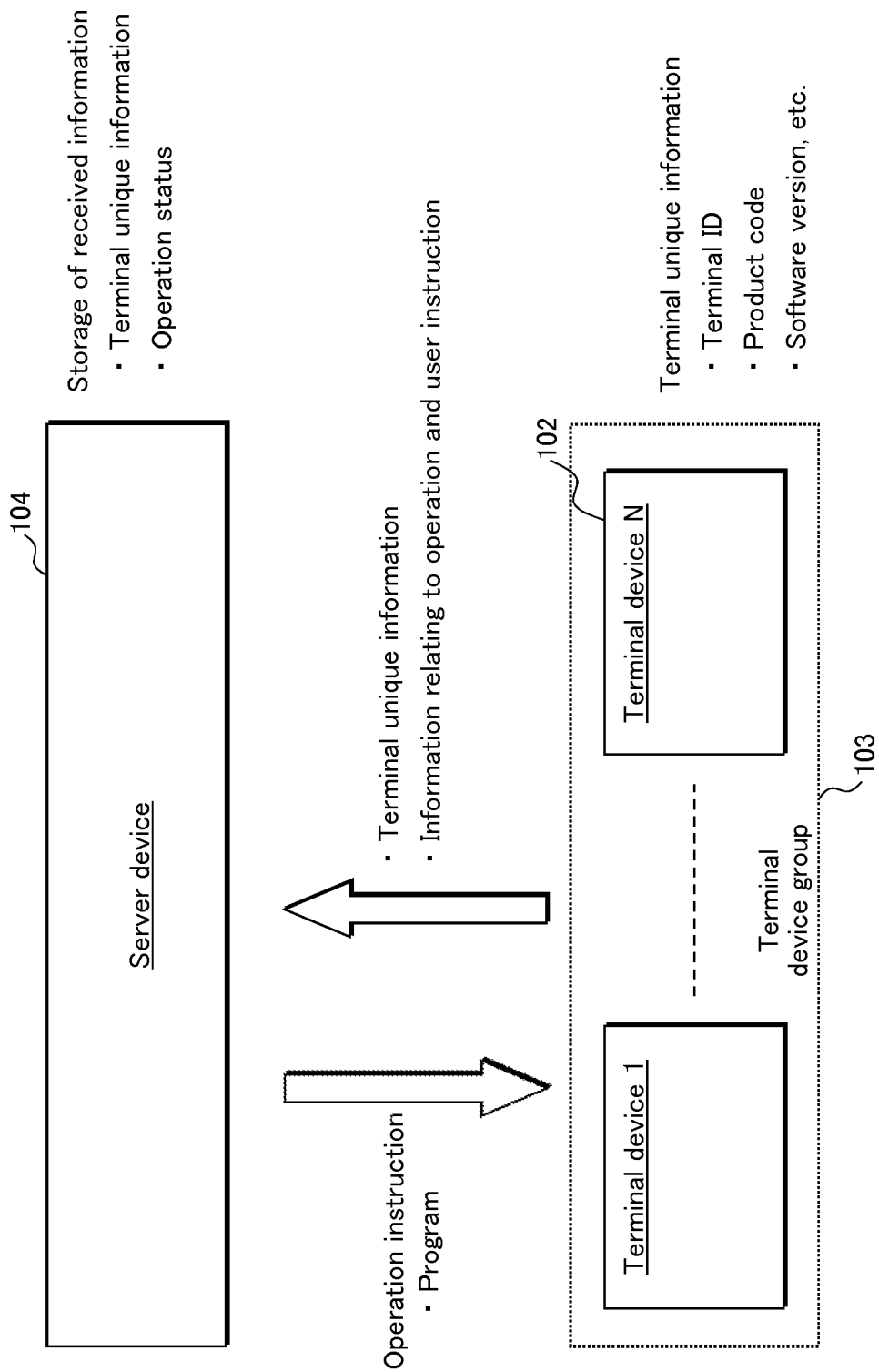
FIG. 5 shows a system structure according to Embodiment 2.

As shown in FIG. 5, a terminal control system according to the present embodiment includes a server device 104 and a plurality of terminal devices 102 constituting a terminal device group 103.

Figure 6:
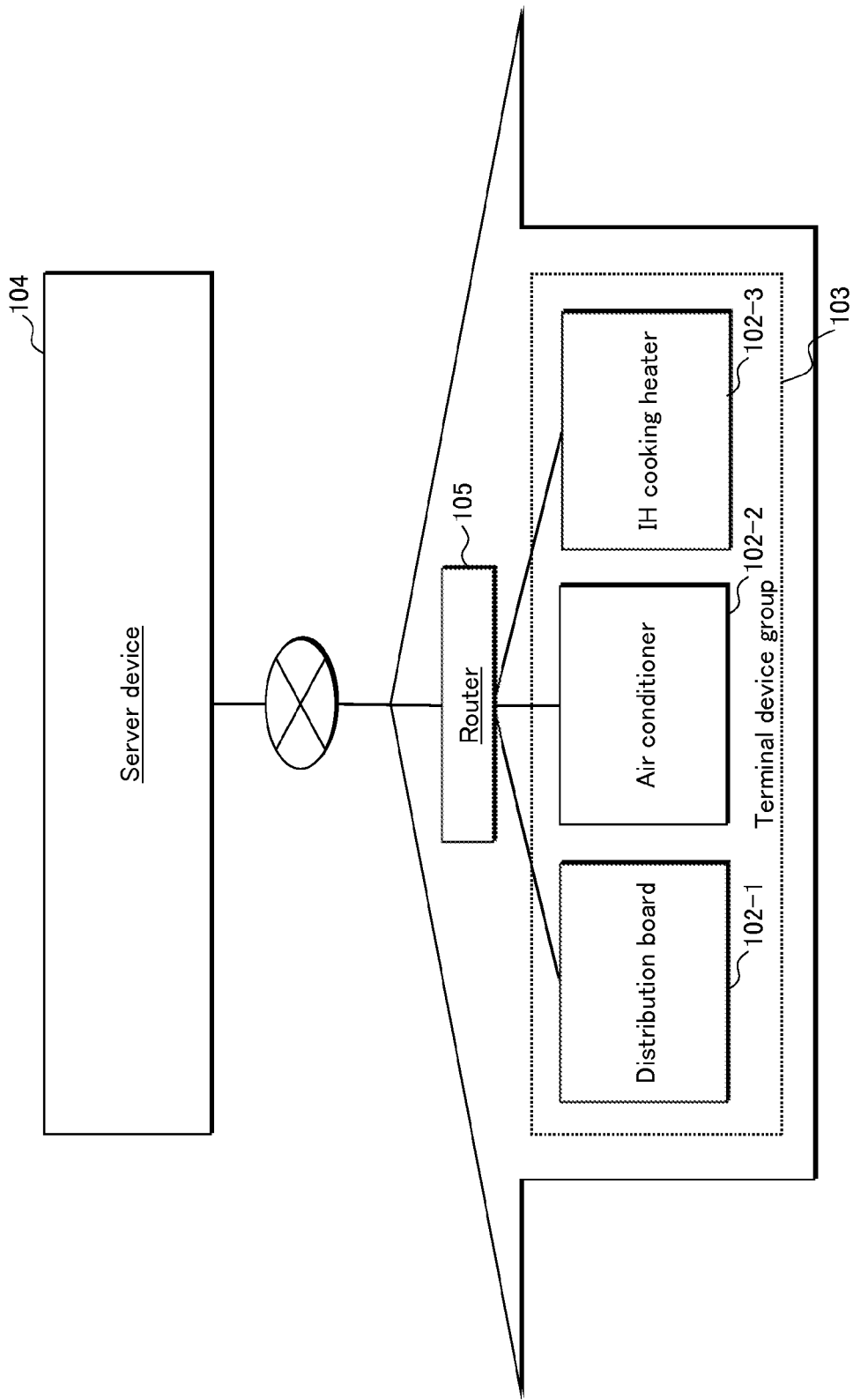
FIG. 6 shows an example of a use case according to Embodiment 2.

FIG. 6 shows an example of a use case according to the present embodiment. The terminal device group 103 includes, as the terminal devices 102, a distribution board 102-1, an air conditioner 102-2, and an IH cooking heater 102-3. A router 105 is a so-called broadband router, and realizes communications between the terminal devices 102 and the server device 104 by an NAPT (Network Address and Port Translation) function. The terminal devices 102 communicate with the server device 104 via the router 105.

2.2 Structure of Server Device 104

The following describes in detail the structure of the server device 104.

Similarly to the server device 101, the server device 104 is realized as a computer composed of a microprocessor, a RAM, a ROM, a hard disk, and so on. FIG. 7 is a functional block diagram of the server device 104. The server device 104 includes, as functional blocks, a transmission and reception unit 211, an instruction determination unit 212, a terminal information management unit 213, an operation status management unit 214, a control unit 215, and a terminal device specification unit 216.

(1) Transmission and Reception Unit 211

The transmission and reception unit 211 is a communication unit for communicating with the terminal devices 102 via a network, and has a GbE (Gigabit Ethernet) interface, for example. The transmission and reception unit 211 receives terminal unique information and an operation status from each of the terminal devices 102.

Also, the transmission and reception unit 211 transmits an instruction to any of the terminal devices 102. Specifically, the transmission and reception unit 211 transmits, to the terminal device 102, an operation instruction indicating that the power is to be switched on, the power-off timer is to be set, the temperature is to be adjusted, etc. Also, the transmission and reception unit 201 transmits, to any of the terminal devices 102, a program for adding a new function or correcting malfunctions. Similarly to the transmission and reception unit 201, the transmission and reception unit 211 may transmit an installer for installing a program, or alternatively, may transmit a downloader for acquiring the program or a URI (Uniform Resource Identifier) indicating the location of the program, instead of transmitting the program.

(2) Terminal Information Management Unit 213 and Operation Status Management Unit 214

The terminal information management unit 213 has a non-volatile recording medium such as a flash memory or a hard disk drive. The terminal information management unit 213 receives the terminal unique information from each of the terminal devices 102 via the transmission and reception unit 211, and stores and manages the terminal unique information as a database in association with connection information. The connection information includes the connection source IP address of the terminal device 102 and connection time, and is generated upon acquisition of the terminal unique information by the transmission and reception unit 211.

The operation status management unit 214 has a non-volatile recording medium such as a flash memory or a hard disk drive. The operation status management unit 214 receives an operation status from each of the terminal devices 102 via the transmission and reception unit 211, and stores and manages the operation status as a database in association with connection information.

FIG. 8 shows a specific example of terminal unique information and an operation status. In FIG. 8, each record includes connection information, along with terminal unique information and an operation status in association with the connection information. Concerning record R1, for example, the terminal unique information includes the terminal ID "12345678" and the product code "AIRCON2011". The terminal ID is an identifier that uniquely identifies the terminal device 102. The product code identifies the type of the terminal device 102. The "AIRCON2011" indicates that the type of the terminal device 102 is an air conditioner and the air conditioner was manufactured in 2011. The operation status in record R1 is "power on". This indicates that the air conditioner is switched on when the operation status is transmitted. Concerning the connection information in record R1, the connection source IP address is "1.2.3.4", and the connection time is "2012/9/26 21:33:50". This indicates that the IPv4 address of the terminal device 102 was "1.2.3.4" at the connection time, and the connection information and the operation status were acquired at 21:33:50 on Sep. 26, 2012.

As described above, the terminal device 102 communicates with the server device 104 via the router 105. Accordingly, the connection source IP address is actually the global IP address of the router 105 at the connection time.

(3) Instruction Determination Unit 212

The instruction determination unit 212 determines an instruction to be transmitted to the terminal device group based on the operation status received via the transmission and reception unit 211, and on both the database managed by the terminal information management unit 213 and the database managed by the operation status management unit 214. The instruction includes at least one of an operation instruction and a program. The instruction determination unit 212 transmits the instruction thus determined to the terminal device 102 via the transmission and reception unit 211. Note that a list of operations for which instructions can be given and programs to be transmitted are stored in a non-volatile recording medium of the instruction determination unit 212, such as a flash memory or a hard disk drive, and are managed by the instruction determination unit 212.

The instruction determination unit 212 holds a plurality of coordination rules, and determines an instruction and a terminal device to which the instruction is to be transmitted, based on the coordination rules held therein and the operation status that has been received. FIG. 10 shows an example of the coordination rules. For example, upon receiving the operation status "the power consumption is greater than or equal to 80% of the allowable amount" from a distribution board, the instruction determination unit 212 determines the following instructions based on RULE 1 in the following order: "reduce heating power" to an IH cooking heater corresponding to "at least one burner is in operation"; "change illuminance setting to 'low'" to an LED light corresponding to "illuminance setting is 'high'"; "change screen brightness to 'dark'" to a television receiver corresponding to "screen brightness is 'bright'"; "suspend drying operation" to a dishwasher corresponding to "in drying operation"; and "change operation mode to 'maintaining heat at 60° C.'" to an electric kettle corresponding to "operation mode is set to maintaining heat at 98° C.". In this way, the server device 104 predicts that the power consumption may exceed the allowable amount, and causes the corresponding terminal devices to perform coordinated operations to reduce the power consumption of the terminal devices. This makes it possible to prevent a circuit breaker from tripping. Also, for example, upon receiving, from an air conditioner, the operation status "humidity is greater than or equal to 70%" as a result of measurement of a hygrometer provided for the outdoor equipment of the air conditioner, the instruction determination unit 212 determines an instruction based on RULE 2. Specifically, the instruction in this case is directed to a washing machine that is either in operation or preset for operation and that corresponds to "operation mode is washing only". The instruction to the washing machine indicates "change operation mode to washing+drying". In this way, the server device 104 predicts, with use of the hygrometer, that the weather may turn bad, and causes the washing machine to perform a coordinated operation to automatically use a drying function. As in the case of RULE 1 described above, the instruction determination unit 212 may determine that different instructions are to be transmitted to the respective terminal devices. In this case, the instruction determination unit 212 may give priority to each terminal device and determine instructions in order of priority.

(4) Terminal Device Specification Unit 216

The terminal device specification unit 216 specifies the terminal device 102 to which the instruction determined by the instruction determination unit 212 is to be transmitted.

Specifically, the terminal device 102 is specified in the following manner. First, the terminal device specification unit 216 acquires the connection information corresponding to the operation status used by the instruction determination unit 212 to determine the instruction. Next, based on the connection source IP address and the connection time indicated by the connection information thus acquired, the terminal device specification unit 216 searches the database managed by the terminal information management unit 213 for connection information that satisfies the following conditions: the connection time is within a predetermined time period, such as five minutes, before and after the connection time indicated by the connection information thus acquired; and the connection source IP address is the same as the connection source IP address indicated by the connection information thus acquired. As described above, the connection source IP address is actually the global IP address of the router 105. Accordingly, the terminal devices 102 with similar connection times and the same connection source IP address are considered to be connected to the same router 105, namely to belong to the same terminal device group 103. Finally, the terminal device specification unit 226 refers to the product code included in the terminal unique information associated with the connection information found as a result of the search, and determines whether the terminal device 102 corresponding to the product code is a candidate for the transmission destination of the instruction determined by the instruction determination unit 212. When determining affirmatively, the terminal device specification unit 216 specifies the terminal device 102 corresponding to the product code as the transmission destination of the instruction.

If not finding any terminal unique information including the product code that corresponds to a candidate for the transmission destination of the instruction, the terminal device specification unit 216 notifies the control unit 215 that no terminal device 102 has been specified.

(5) Control Unit 215

The control unit 215 manages and controls the transmission and reception unit 211, the instruction determination unit 212, the terminal information management unit 213, the operation status management unit 214, and the terminal device specification unit 216 as described above, and thereby realizes the functions of the server device 104.

2.4 Operation of Terminal Control System

Figure 9:
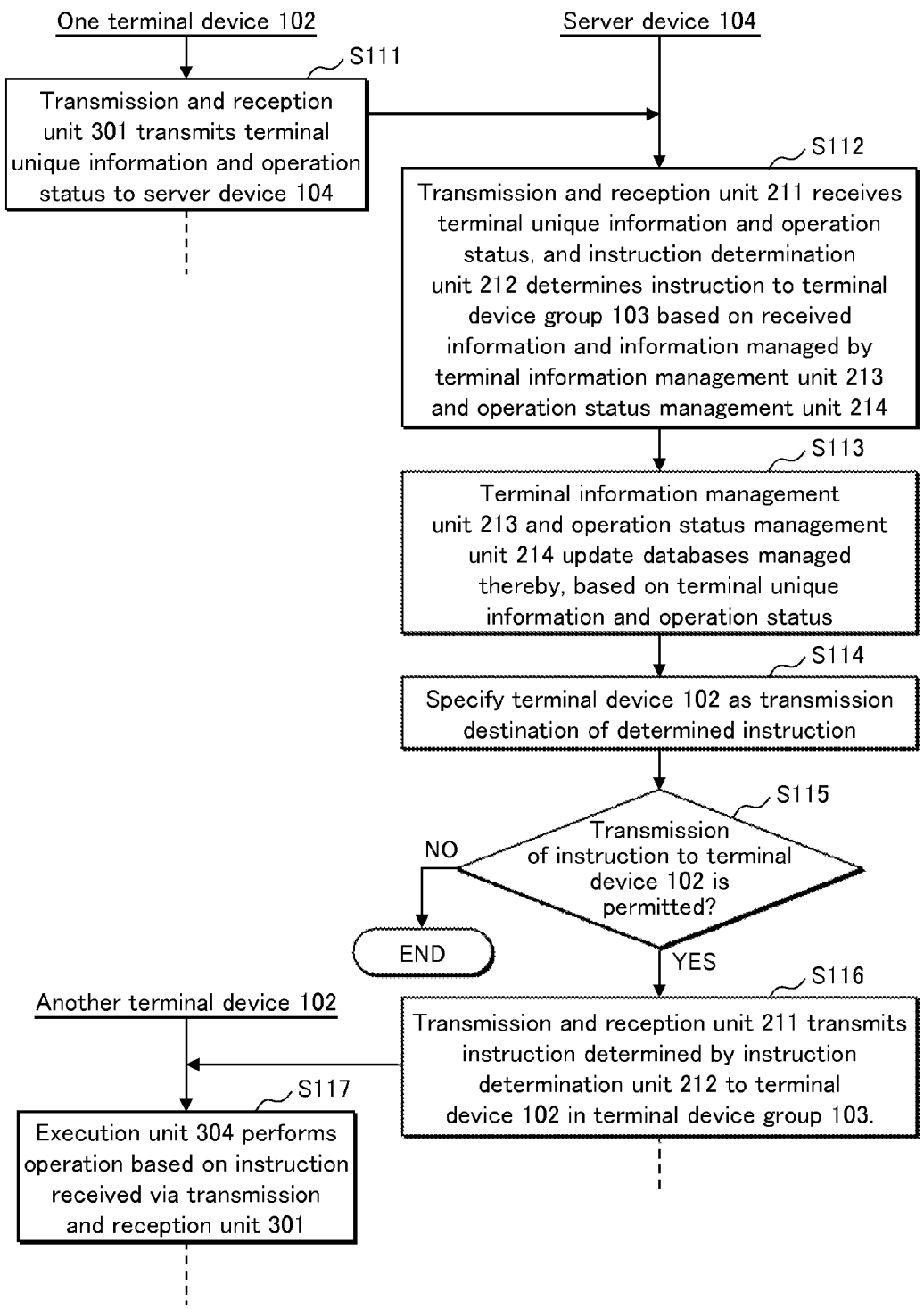
FIG. 9 is a flowchart showing a process of receiving an operation instruction according to Embodiment 2.

The following describes an example of an operation of a terminal control system according to the present embodiment. FIG. 9 is a flowchart showing an operation of the terminal control system according to the present embodiment.

First, one of the terminal devices 102 transmits, to the server device 104 via the transmission and reception unit 301, an operation status and the terminal unique information held in the terminal information holding unit 302 (step S111). The operation status is either information relating to the operation performed by the execution unit 304 or a user instruction received by the input reception unit 303. The terminal device 102 performs step S111 when the input reception unit 303 has received a user instruction or when the execution unit 304 performs an operation.

The server device 104 receives the operation status and the terminal unique information from the terminal device 102 via the transmission and reception unit 211, and the instruction determination unit 212 determines at least one instruction to be transmitted to the terminal device group 103, based on the operation status received by the transmission and reception unit 211, the terminal unique information managed by the terminal information management unit 213, and the operation status managed by the operation status management unit 214 (step S112).

The following describes the operation of step S112 in detail. In FIG. 8, records R1 to R4 are acquired from the air conditioner 102-2, and the product code "AIRCON2011" indicates an air conditioner. Similarly, records R11 to R14 are acquired from the distribution board 102-1, and the product code "PANEL2012" indicates a distribution board. Also, records R21 to R24 are acquired from the IH cooking heater 102-3, and the product code "IHCH2010" indicates an IH cooking heater.

For example, when the transmission and reception unit 211 receives record R11 in FIG. 8 from the distribution board 102-1, the instruction determination unit 212 recognizes that the power consumption is 85% of the allowable amount. The instruction determination unit 212 refers to the coordination rules in FIG. 10, and determines whether there is any instruction that can be transmitted to the terminal device group 103 upon receiving, from the terminal device "distribution board", the operation status "the power consumption is 85% of the allowable amount". The instruction determination unit 212 determines that instructions can be transmitted based on RULE 1 in the coordination rules in FIG. 10. Accordingly, the instruction determination unit 212 determines that the instruction "reduce heating power" is to be transmitted when the terminal device "IH cooking heater" is in the operation status "at least one burner is in operation". Similarly, the instruction determination unit 212 determines that the following instructions are to be transmitted in the following cases: "change illuminance setting to 'low'" when the LED light is in the operation status "illuminance setting is 'high'"; "change screen brightness to 'dark'" when the television receiver is in the operation status "screen brightness is 'bright'"; "suspend drying operation" when the dishwasher is in the operation status "in drying operation"; and "change operation mode to 'maintaining heat at 60° C.'" when the electric kettle is in the operation status "operation mode is set to maintaining heat at 98° C.".

The terminal information management unit 213 of the server device 104 updates the database managed thereby, based on the terminal unique information received by the transmission and reception unit 211. Also, the operation status management unit 214 updates the database managed thereby, based on the operation status received by the transmission and reception unit 211 (step S113).

Next, the server device 104 specifies at least one terminal device 102 to which the at least one instruction determined by the instruction determination unit 212 is to be transmitted (step S114). The description now returns to the specific example given above. The determination unit 212 determines an instruction based on the operation status corresponding to record R11 in FIG. 8. Accordingly, the terminal device specification unit 216 searches the database managed by the terminal information management unit 213 for terminal unique information corresponding to the connection information that satisfies the following conditions: the connection source is the connection source IP address "1.2.3.4" as in record R11; and the connection time is within five minutes before and after the connection time "21:37:50 on Sep. 26, 2012" in record R11. Record R1 and record R21 each include the terminal unique information satisfying the above conditions. Next, the terminal device specification unit 216 determines whether the terminal devices 102 corresponding to the product codes in records R1 and R21 are candidates for the transmission destinations of the instruction. The product code of record R1 is "AIRCON2011", and the product code of record R21 is "IHCH2010". Accordingly, the terminal device specification unit 216 determines that the terminal device corresponding to record R1 is the air conditioner 102-2, and the terminal device corresponding to record R21 is the IH cooking heater 102-3. By the above processing, the terminal device specification unit 216 specifies the terminal ID "98765432" identifying the IH cooking heater 102-3 in record R21 as the terminal ID identifying the terminal device to which the instruction is to be transmitted.

Next, the terminal device specification unit 216 determines whether transmission of the instruction to the terminal device 102 is permitted (step S115). The description now returns to the specific example given above. The terminal device specification unit 216 acquires the operation status of the terminal device 102-3 identified by the specified terminal ID "98765432", from the database managed by the operation status management unit 214, and determines whether the terminal device 102-3 is in a state of receiving the instruction, namely in the operation state "at least one burner is in operation". Since record R21 indicates the operation status "power on, heating power 5", the terminal device specification unit 216 determines that the IH cooking heater 102-3 is in the operation status "at least one burner is in operation". Accordingly, the terminal device specification unit 216 determines that transmission of the instruction to the IH cooking heater 102-3 identified by the terminal ID "98765432" is permitted.

When the terminal device specification unit 216 determines that transmission of the instruction to the terminal device 102 is permitted, the transmission and reception unit 211 of the server device 104 transmits the instruction to the terminal device 102 (step S116). For example, the transmission and reception unit 211 transmits, to the connection source IP address "1.2.3.4", the instruction "reduce heating power" directed to the IH cooking heater 102-3 identified by the terminal ID "98765432". The communication channel between the server device 104 and the IH cooking heater 102-3 may be established in advance. Alternatively, the IH cooking heater 102-3 may connect to the server device 104 periodically to receive an instruction. Yet alternatively, the server device 104 may be connected to the IH cooking heater 102-3 by the UPnP (Universal Plug and Play) function of the router 105. The server device 104 ends processing when the terminal device specification unit 216 determines that transmission of the instruction to the terminal device 102 is not permitted.

The terminal device 102 receives the instruction via the transmission and reception unit 301, and the execution unit 304 performs an operation based on the received instruction (step S117). In the above example, the execution unit 304 of the IH cooking heater 102-3 identified by the terminal ID "98765432" changes the heating power from 5 to 3.

2.5 Summary

As described above, based on an operation performed by one of the terminal devices 102 in the terminal device group 103, or on a user instruction received by one of the terminal devices 102 in the terminal device group 103, a different one of the terminal devices 102 in the same terminal device group 103 is caused to perform a coordinated operation. At this time, the server device 104 specifies the different terminal device 102 with use of the connection time and the connection source IP address obtained when each of the terminal devices 102 has connected to the server device 104. In this way, the server device 104 does not need to hold data indicating which terminal device 102 belongs to which terminal device group 103. Accordingly, the user does not need to perform user registration or the like for registering each of the terminal devices 102 (e.g., electric household appliances) of the user with the server device 104. Instead, the user can simply connect the terminal devices 102 to a network, so that the terminal devices 102 can perform coordinated operations with each other.

Embodiment 3

In the present embodiment, a description is provided on a structure in which, when a terminal device is a portable device that can easily be carried outside a home, the portable device outside the home can perform a coordinated operation with a terminal device inside the home.

Note that the same constituent elements as in Embodiments 1 and 2 are provided with the same reference signs, and the same operation steps as in Embodiments 1 and 2 are provided with the same step numbers, and the descriptions thereof are omitted.

3.1 Structure of Terminal Control System

Figure 11:
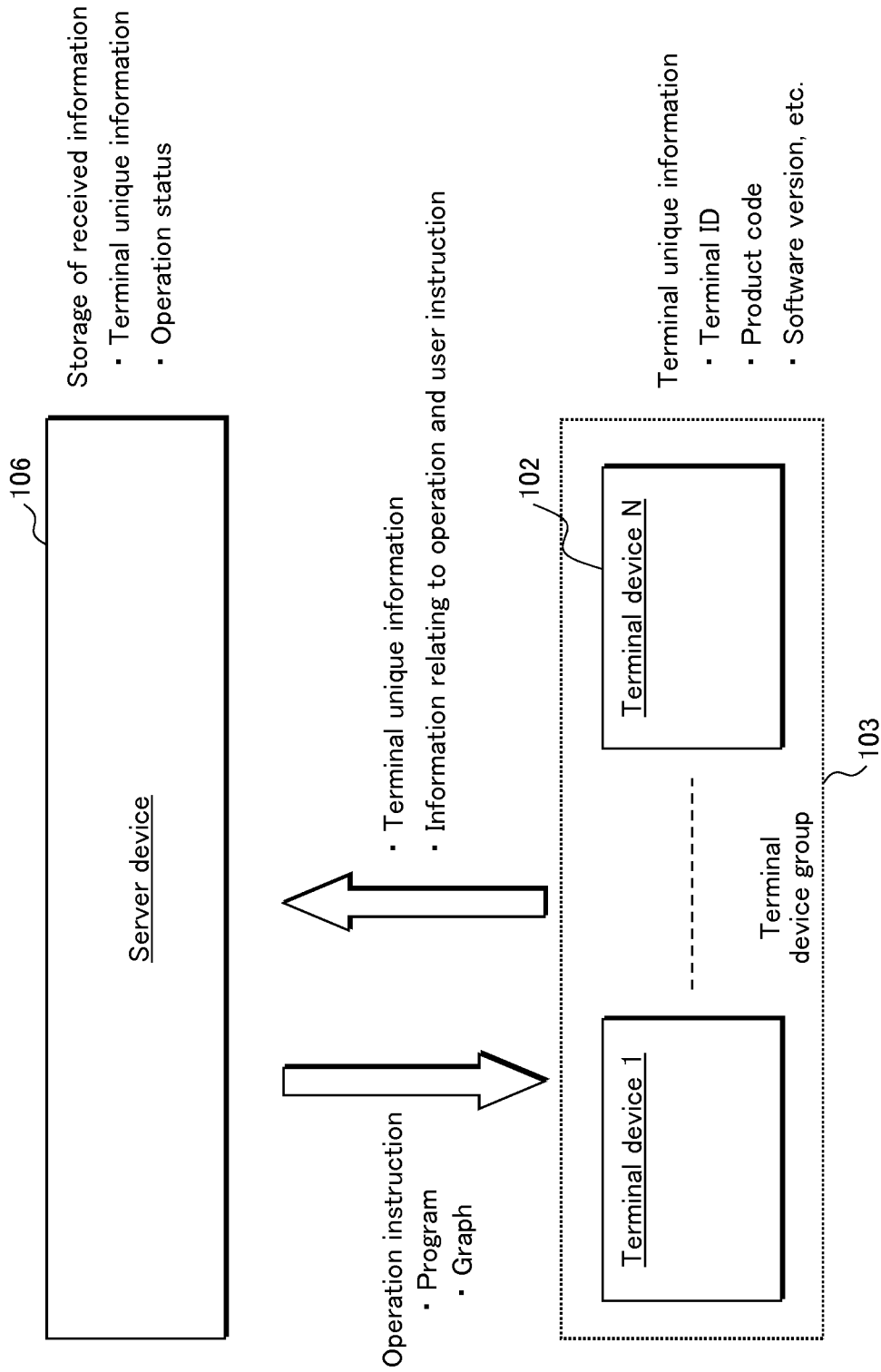
FIG. 11 shows a system structure according to Embodiment 3.

As shown in FIG. 11, a terminal control system according to the present embodiment includes a server device 106 and a plurality of terminal devices 102 constituting a terminal device group 103.

Figure 12:
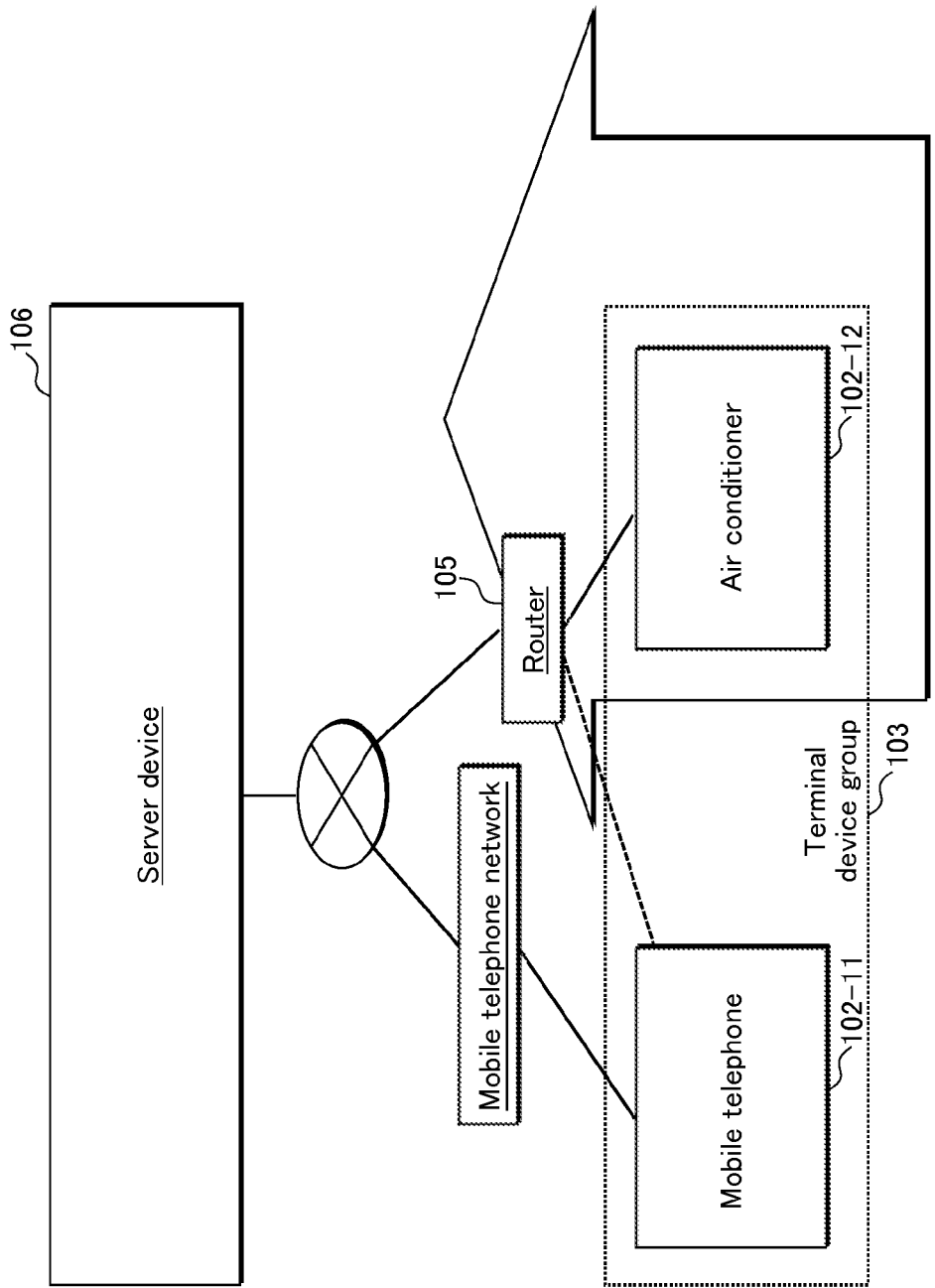
FIG. 12 shows an example of a use case according to Embodiment 3.

FIG. 12 shows an example of a use case according to the present embodiment. The terminal device group 103 includes a mobile telephone 102-11 and an air conditioner 102-12. As in the case of Embodiment 2, the air conditioner 102-12 communicates with the server device 106 via the router 105. On the other hand, the mobile telephone 102-11 communicates with the server device 106 as follows. That is, when used inside a home, the mobile telephone 102-11 connects with the router 105 using IEEE802.11n, and communicates with the server device 106 via the router 105. When used outside a home, the mobile telephone 102-11 connects to a mobile telephone network using LTE (Long Term Evolution), for example, and connects with the server device 106 via the mobile telephone network.

3.2 Structure of Server Device 106

The following describes in detail the structure of the server device 106.

Similarly to the server devices 101 and 104, the server device 106 is realized as a computer composed of a microprocessor, a RAM, a ROM, a hard disk, and so on.

Figure 13:
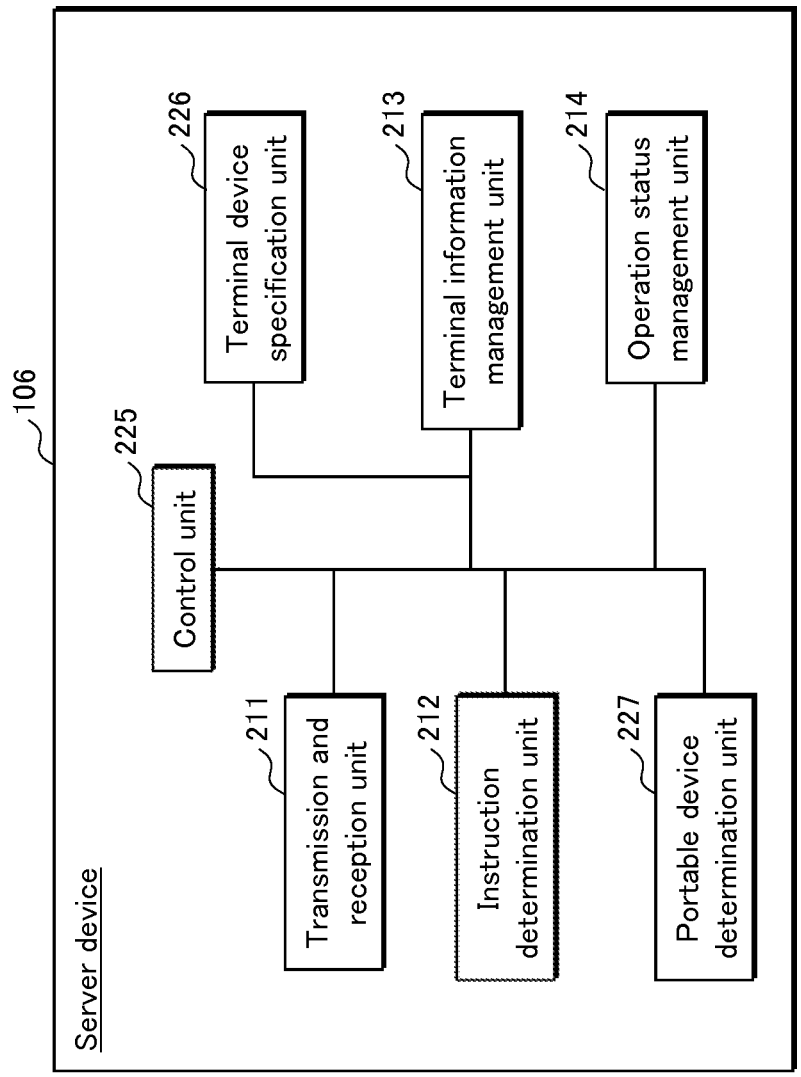
FIG. 13 shows the structure of a server device according to Embodiment 3.

FIG. 13 is a functional block diagram of the server device 106. The server device 106 has the same structure as the server device 104 except that the server device 106 further includes a portable device determination unit 227, and includes a control unit 225 and a terminal device specification unit 226 instead of the control unit 215 and the terminal device specification unit 216.

(1) Portable Device Determination Unit 227

The portable device determination unit 227 determines whether each of the terminal devices 102 is a portable device that may be carried outside the home or a terminal device always used inside the home, based on the terminal unique information managed by the terminal information management unit 213. Specifically, the portable device determination unit 227 uses the product code in the terminal unique information to determine whether the terminal device corresponding to the product code is a portable device. For example, concerning the terminal unique information in R51 and R52 in FIG. 14, the product code "CELLPHONE" indicates a mobile telephone. Accordingly the portable device determination unit 227 determines that the terminal device identified by the terminal ID 5678 is a portable device. Similarly, concerning the terminal unique information in R31 and R41, the product code "AIRCON2012" indicates an air conditioner, and the "WASHER2010" indicates a washing machine. Accordingly, the portable device determination unit 227 determines that the terminal devices identified by the terminal IDs 12345678 and 98765432 are not portable devices.

(2) Terminal Device Specification Unit 226

The terminal device specification unit 226 specifies the terminal device 102 to which the instruction determined by the instruction determination unit 212 is to be transmitted.

Specifically, the terminal device specification unit 226 specifies the terminal device 102 in the following manner. First, the terminal device specification unit 226 acquires the operation status used by the instruction determination unit 212 to determine the instruction, makes an inquiry to the portable device determination unit 227 as to whether the terminal device 102 corresponding to the operation status is a portable device. When the terminal device 102 corresponding to the inquiry is not a portable device, the terminal device specification unit 226 specifies the terminal device 102 to which the instruction is to be transmitted, in the same manner as the terminal device specification unit 216.

On the other hand, when the terminal device 102 corresponding to the inquiry is a portable device, the terminal device specification unit 226 acquires terminal unique information corresponding to the operation status used by the instruction determination unit 212 to determine the instruction. Next, based on the terminal ID in the acquired terminal unique information, the terminal device specification unit 226 searches the database managed by the terminal information management unit 213 for a pair of (i) the terminal unique information including the same terminal ID as the terminal ID in the acquired terminal unique information and (ii) the terminal unique information corresponding to the connection information that satisfies the following conditions: the connection source IP address is the same as the connection source IP address associated with the terminal unique information including the same terminal ID; and the connection time is within a predetermined time period before and after the connection time associated with the terminal unique information including the same terminal ID. Note that when the terminal device 102 corresponding to the operation status used by the instruction determination unit 212 to determine the instruction is a portable device, the connection source IP address of that terminal device 102 can be either the global IP address of the router 105 or the global IP address allocated by the mobile telephone network. Accordingly, the terminal device group 103 connected to the router 105 can be found by referring to the past connection source IP address of the terminal device 102 that is a portable device, as well as the current connection source IP address thereof, and by using the connection information including the global IP address of the router 105 as the connection source IP address. Finally, the terminal device specification unit 226 refers to the product code included in the terminal unique information found as result of the search, and determines whether the terminal device 102 corresponding to the product code is a candidate for the transmission destination of the instruction determined by the instruction determination unit 212. When determining affirmatively, the terminal device specification unit 226 specifies the terminal device 102 corresponding to the product code as the transmission destination of the instruction.

If not finding any terminal unique information including the product code that corresponds to a candidate for the transmission destination of the instruction, the terminal device specification unit 226 notifies the control unit 215 that no terminal device 102 has been specified.

(3) Control Unit 225

The control unit 225 manages and controls the transmission and reception unit 211, the instruction determination unit 212, the terminal information management unit 213, the operation status management unit 214, the terminal device specification unit 226, and the portable device determination unit 227 as described above, and thereby realizes the functions of the server device 106.

3.4 Operation of Terminal Control System

The following describes an example of an operation of a terminal control system according to the present embodiment. FIG. 15 is a flowchart showing an operation of the terminal control system according to present disclosure.

First, one of the terminal devices 102 transmits, to the server device 106 via the transmission and reception unit 301, an operation status and the terminal unique information held in the terminal information holding unit 302 (step S111). The operation status is either information relating to the operation performed by the execution unit 304 or a user instruction received by the input reception unit 303. For example, the mobile telephone 102-11 receives a user instruction indicating that the power of an air conditioner is to be switched off, and transmits the operation status "air conditioner off" to the server device 106.

The server device 106 receives the operation status and the terminal unique information from the terminal device 102 via the transmission and reception unit 211, and the instruction determination unit 212 determines at least one instruction to be transmitted to the terminal device group 103, based on the operation status received by the transmission and reception unit 211, the terminal unique information managed by the terminal information management unit 213, and the operation status managed by the operation status management unit 214 (step S112).

The following describes the operation of step S112 in detail. For example, when the transmission and reception unit 211 receives R52 in FIG. 14, the instruction determination unit 212 recognizes that the user has given an instruction with use of the mobile telephone 102-11 identified by the terminal ID "5678", and that the instruction indicates "air conditioner off". The instruction determination unit 212 refers to the coordination rules held thereby, and determines whether there is any instruction that can be transmitted to the terminal device group 103 upon receiving, from the terminal device "mobile telephone", the operation status "air conditioner off". When the terminal device "air conditioner" is in the operation status "power on", the instruction determination unit 212 determines that the instruction indicating "power off" is to be transmitted.

The terminal information management unit 213 of the server device 106 updates the database managed thereby, based on the terminal unique information received by the transmission and reception unit 211, and the operation status management unit 214 updates the database managed thereby, based on the operation status received by the transmission and reception unit 211 (step S113).

Next, the portable device determination unit 227 of the server device 106 determines whether the terminal device 102 corresponding to the operation status used by the instruction determination unit 212 to determine the instruction is a portable device (step S124). For example, suppose that the instruction determination unit 212 has determined an instruction based on the operation status indicated in R52 shown in FIG. 14. In this case, since the product code of the terminal device 102 corresponding to the operation status used by the instruction determination unit 212 to determine the instruction is "CELLPHONE", the portable device determination unit 227 determines that the mobile telephone 102-11, which is the terminal device 102, is a portable device.

Next, the server device 106 specifies at least one terminal device 102 to which the at least one instruction determined by the instruction determination unit 212 is to be transmitted (step S125). For example, suppose that the portable device determination unit 227 has determined that the terminal device 102 corresponding to the operation status used by the instruction determination unit 212 to determine the instruction is a portable device. In this case, the terminal device specification unit 226 searches the database managed by the terminal information management unit 213 for a pair of (i) terminal unique information X including the same terminal ID as the terminal ID "5678" in R52 and (ii) terminal unique information Y corresponding to the connection information that satisfies the following conditions: the connection source IP address is the same as the connection source IP address associated with the terminal unique information X; and the connection time is within five minutes before and after the connection time associated with the terminal unique information X. Such a pair satisfying the above conditions consists of the terminal unique information in R51 as the terminal unique information X and the terminal unique information in R31 as the terminal unique information Y. Next, the terminal device specification unit 226 determines whether the terminal device 102 corresponding to the product code in record R31 is a candidate for the transmission destination of the instruction. Since the product code in record R31 is "AIRCON2012", the terminal device specification unit 226 determines that the terminal device 102 corresponding to record R31 is the air conditioner 102-12. By the above processing, the terminal device specification unit 226 specifies the terminal ID "12345678" identifying the air conditioner 102-12 as the terminal ID identifying the terminal device to which the instruction is to be transmitted.

Next, the terminal device specification unit 226 determines whether transmission of the instruction to the terminal device 102 is permitted (step S115). For example, the terminal device specification unit 226 acquires the operation status of the air conditioner 102-12 identified by the specified terminal ID "12345678" from the database managed by the operation status management unit 214, and determines whether the air conditioner 102-12 is ready to receive the instruction, namely in the operation status "power on". Since record R35 indicates the operation status "power on", the terminal device specification unit 226 determines that the air conditioner 102-12 is in operation, and that transmission of the instruction to the air conditioner 102-12 is permitted.

When the terminal device specification unit 226 determines that transmission of the instruction to the terminal device 102 is permitted, the transmission and reception unit 211 of the server device 106 transmits the instruction to the terminal device 102 (step S126). Here, the transmission and reception unit 211 acquires, from the database managed by the terminal information management unit 213, the latest connection information corresponding to the terminal ID identifying the terminal device 102 to which the instruction is to be transmitted, and specifies the connection source IP address of the terminal device 102 using the latest connection information. For example, the transmission and reception unit 211 specifies the connection source IP address "1.2.5.6", which is the connection source IP address of the air conditioner 102-2, from the latest connection information R35 corresponding to the air conditioner 102-2.

The terminal device 102 receives the instruction via the transmission and reception unit 301, and the execution unit 304 performs an operation based on the received instruction (step S117). In the above example, the execution unit 304 of the air conditioner identified by the terminal ID "12345678" switches off its power.

3.5 Other Examples of Coordination Rules

Thus far, a description has been provided of an example in which the air conditioner is caused to perform a coordinated operation based on the operation status acquired from the mobile telephone. However, the present disclosure is not limited to this example. The following coordination rules are also acceptable.

For example, upon receiving an operation status "acquire images inside a refrigerator" from the mobile telephone, the server device may transmit, to a terminal device "refrigerator", an instruction "capture the images of the rooms of the refrigerator, and transfer the images to the mobile telephone". In this way, the user can check what is inside the refrigerator while he is shopping. As a result, the user can avoid situations such as forgetting to buy some products or buying the same products that are already in the refrigerator.

Alternatively, for example, upon receiving an operation status "return home two hours late" from the mobile telephone, the server device may transmit, to a terminal device "rice cooker", an instruction "if the timer is set, and rice cooking is not started yet, then delay the preset cooking time by two hours". In this way, when the user cannot return home timely for the preset cooking time, he can change the preset cooking time appropriately according to the time he can return home. As a result, the user can avoid situations such as the rice being cooked too early or the rice not being cooked yet.

3.6 Summary

As described above, based on an operation performed by a first one of the terminal devices 102 in the terminal device group 103, or on a user instruction received by the first terminal device 102 in the terminal device group 103, a second one of the terminal devices 102 in the same terminal device group 103 is caused to perform a coordinated operation. At this time, even if the first terminal device 102 is a portable device such as a mobile telephone, the second terminal device 102 can be specified with use of the connection time and the connection source IP address obtained when the first terminal device 102 accessed the server device 106 in the past. This allows the user to cause his electric household appliance to perform a coordinated operation with use of his mobile telephone or the like when he is outside the home, without having to perform user registration or the like for registering each of the terminal devices 102 of the user with the server device 106.

(Modification 1)

4.1 Operation of Terminal Control System

In Embodiment 3, a description is provided of a case where an instruction is transmitted to one of the terminal devices 102 that is not a portable device, based on the operation status acquired from another one of the terminal devices 102 that is a portable device.

In the present modification, a description is provided of a case where an instruction is transmitted to one of the terminal devices 102 that is a portable device, based on the operation status acquired from another one of the terminal devices.

Figure 16:
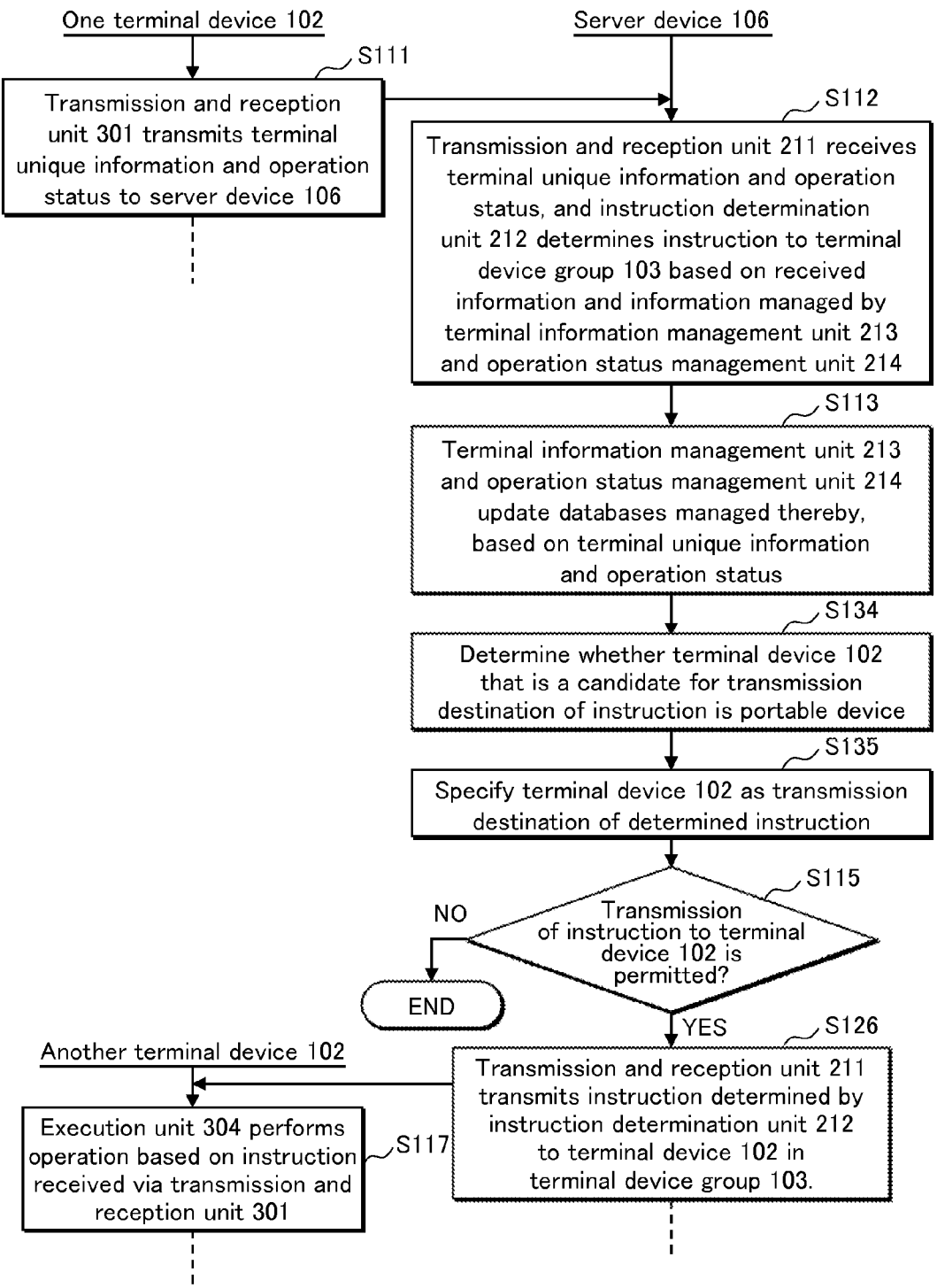
FIG. 16 is a flowchart showing a process of receiving an operation instruction according to Modification 1 of Embodiment 3.

FIG. 16 shows a flowchart of an operation according to the present modification. As shown in FIG. 16, the same operation as in Embodiments 2 and 3 is performed up to step S113, in which the terminal information management unit 213 and the operation status management unit 214 of the server device 106 update their respective databases. Accordingly, a description thereof is omitted here.

Next, the portable device determination unit 227 of the server device 106 determines whether the terminal device 102 that is a candidate for the transmission destination of the instruction determined by the instruction determination unit 212 is a portable device (step S134). For example, when the terminal device 102 that is a candidate for the transmission destination is a mobile telephone, the portable device determination unit 227 determines that the terminal device 102 is a portable device.

Next, the server device 106 specifies at least one terminal device 102 to which at least one instruction determined by the instruction determination unit 212 is to be transmitted (step S135). Here, in a case where the portable device determination unit 227 has determined that the terminal device 102 that is a candidate for the transmission destination of the instruction is a portable device, the terminal device specification unit 226 performs the same step as step S125, i.e., searches the database managed by the terminal information management unit 213 for a pair of (i) the terminal unique information corresponding to the operation status used to determine the instruction and (ii) the terminal unique information corresponding to the connection information that satisfies the following conditions: the connection source IP address is the same as the connection source IP address associated with the terminal unique information corresponding to the operation status used to determine the instruction; and the connection time is within a predetermined time period before and after the connection time associated with the terminal unique information corresponding to the operation status used to determine the instruction. Then, the terminal device specification unit 226 refers to the product code included in the terminal unique information found as a result of the search, and determines whether the terminal device 102 corresponding to the product code is a candidate for the transmission destination of the instruction determined by the instruction determination unit 212. When determining affirmatively, the terminal device specification unit 226 specifies the terminal device 102 corresponding to the product code as the transmission destination of the instruction.

Next, the terminal device specification unit 226 determines whether transmission of the instruction to the terminal device 102 is permitted (step S115). The terminal device specification unit 226 acquires the operation status of the specified terminal device 102 from the database managed by the operation status management unit 214, and determines whether the terminal device 102 is in a state of receiving the instruction.

When the terminal device specification unit 226 determines that transmission of the instruction to the terminal device 102 is permitted, the transmission and reception unit 211 of the server device 106 transmits the instruction to the terminal device 102 (step S126).

The terminal device 102 receives the instruction via the transmission and reception unit 301, and the execution unit 304 performs an operation based on the received instruction (step S117).

This allows a portable device outside the home such as a mobile telephone to perform a coordinated operation, based on the operation status of a terminal device inside the home. For example, the server device 106 can notify the mobile telephone of the user who is away from home of the operation status of an electric household appliance in the home.

4.2 Examples of Coordination Rules

The following describes coordination rules for causing a portable device, such as a mobile telephone outside a home, to perform a coordinated operation based on an operation status acquired from an electric household appliance inside the home.

For example, when the server device does not receive an operation status "cancel outdoor mode" within three minutes after receiving an operation status "person has been detected while in outdoor mode" from a terminal device "air conditioner", the server device may transmit an instruction "display a message indicating that an intruder is in the home" to a terminal device "mobile telephone". Specifically, the user sets the air conditioner to the outdoor mode with use of a remote control immediately before going out. The air conditioner transmits the operation status indicating that it has been set to the outdoor mode to the server device. Also, upon detecting a person with a human detection sensor in the indoor equipment of the air conditioner, the air conditioner transmits the operation status indicating the detection to the server device. When the following conditions are satisfied: the server device receives, from the air conditioner, the operation status indicating the detection of a person while the air conditioner is set to the outdoor mode; and the server device has not received, from the same air conditioner, the operation status indicating cancellation of the outdoor mode within three minutes after the detection of the person, then the server device determines an instruction instructing a smartphone to display a message indicating "an intruder is in the home" based on the coordination rules. Next, the server device transmits the instruction thus determined, i.e., the instruction regarding display of the message indicating "an intruder is in the home", to each smartphone in the terminal device group 103 to which the air conditioner belongs.

Another example is that, when receiving an operation status "child has returned home" from a terminal device "electronic lock system", the server device may transmit an instruction "display a message indicating that a child has returned home" to a terminal device "mobile telephone". Specifically, when a child of the user opens the electronic lock system with the corresponding key given by the user, the electronic lock system transmits the operation status "child has returned home" to the server device. The server device transmits the instruction "display a message indicating that a child has returned home" to the mobile telephone, based on the coordination rules. Note that the trigger for the server device to transmit the instruction does not always need to be upon receipt of the operation status "child has returned home" from the terminal device "electronic lock system". Instead, the trigger may be upon receipt of an operation status "a television program aimed at children is being viewed" from a terminal device "television receiver". In this case, the television receiver can determine whether the television program currently being viewed is aimed at children, based on, for example, genre information in an EPG (Electronic Program Guide), the title of the television program, or the like. Note that the television receiver may simply transmit, as an operation status, the title of the television program currently being viewed and genre information on the television program, and the server device may determine whether the television program is aimed at children based on the operation status.

(Modification 2)

5.1 Operation of Terminal Control System

In Embodiments 2 and 3, determination as to whether terminal devices belong to the same terminal device group 103 is performed based on the condition that: the pieces of connection information of the respective terminal devices indicate the same connection source IP address; and the connection times in the respective pieces of connection information are in temporal proximity. However, the above structure has the following problem. Suppose that an instruction is transmitted to one of the terminal devices 102 in the terminal device group 103, based on a portable device temporarily included in the terminal device group 103. In this case, even after the portable device no longer belongs to the terminal device group 103, an instruction may still be transmitted to one of the terminal devices 102 in the terminal device group 103 based on an operation status acquired from the portable device. This is caused due to the history that the portable device was once included in the terminal device group 103. Specifically, suppose that a student visits his parents' home, and causes an electric household appliance in the parents' home to perform a coordinated operation based on the operation status of his mobile telephone. In this case, even after the student leaves his parents' home, an electric household appliance in his parents' home may be caused to perform a coordinated operation based on the operation status of the mobile telephone.

To address this issue, the server device 106 may further include an instruction permission information management unit. The instruction permission information management unit acquires coordination permission from the user, and manages the coordination permission as a database. The coordination permission indicates whether an instruction is permitted to be transmitted to one of the terminal devices 102 based on the operation status of another one of the terminal devices 102. The server device 106 may determine whether to transmit the instruction based on the database.

Figure 17:
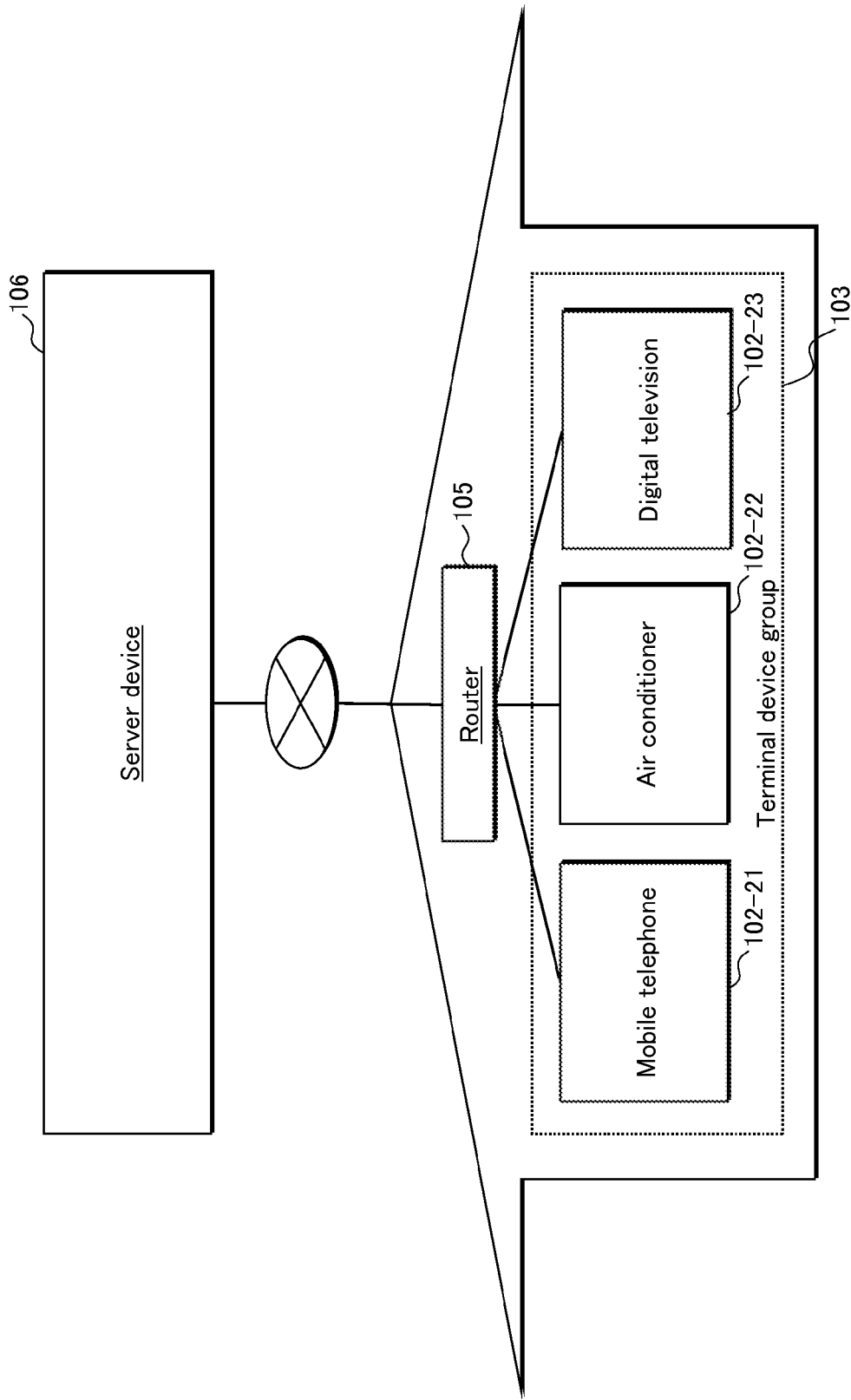
FIG. 17 shows an example of a use case according to Modification 2 of Embodiment 3.

Specifically, the instruction permission information management unit manages coordination permission given by the user, the coordination permission being for a pair of (i) a device ID of the terminal device 102 corresponding to the operation status used by the instruction determination unit 212 to determine an instruction and (ii) a device ID of the terminal device 102 that is a candidate for the transmission destination of the instruction. FIG. 17 shows an example of a use case according to the present modification. In this example, the terminal device 102 corresponding to the operation status used by the instruction determination unit 212 to determine an instruction is a mobile telephone 102-21. The terminal device 102 that is a candidate for the transmission destination of the instruction is an air conditioner 102-22. Also, a television receiver 102-23 is a display device which is described later. In step S115, the server device 106 determines whether coordination permission is given by the user for a pair of (i) a device ID of the terminal device 102 corresponding to the operation status used by the instruction determination unit 212 to determine an instruction and (ii) a device ID of the terminal device 102 that is a candidate for the transmission destination of the instruction.

When the coordination permission is given, the server device 106 determines that permission is given for transmission of the instruction to the terminal device 102 that is a candidate for the transmission destination of the instruction. On the other hand, when the coordination permission is not given, the server device 106 transmits, to a display device, an instruction for displaying an inquiry message as to whether a coordinated operation is permitted. If a coordination permission is given by the user via the display device, the server device 106 registers, with the database managed by the instruction permission information management unit, information indicating that the coordination permission is given for the pair of (i) the device ID of the terminal device 102 corresponding to the operation status used by the instruction determination unit 212 to determine the instruction and (ii) the device ID of the terminal device 102 that is a candidate for the transmission destination of the instruction. Then, the server device 106 determines that permission is given for transmission of the instruction to the terminal device 102 that is a candidate for the transmission destination of the instruction.

The display device mentioned above is one of the terminal devices 102 that belong to the same terminal device group 103, and includes a display unit and an input unit. For example, the display device is the television receiver 102-23. For example, the terminal device specification unit 226 can specify the display device in the same manner as specifying the terminal device 102 to which an instruction is to be transmitted. That is, the terminal device specification unit 226 searches for the terminal unique information that includes a product code "TV" indicating a television receiver, and that corresponds to the connection information satisfying the following conditions: the connection source IP address is the same as the connection source IP address associated with the terminal unique information corresponding to the operation status used by the instruction determination unit 212 to determine the instruction; and the connection time is in temporal proximity to the connection time associated with the terminal unique information corresponding to the operation status used to determine the instruction. When such terminal unique information is found, the terminal device specification unit 226 can specify the television receiver 102-23 as the display device. For example, the television receiver 102-23, which is a display device, displays an inquiry message as to whether a coordinated operation is permitted for the pair of the mobile telephone 102-21 and the air conditioner 102-22, and receives an instruction from the user with a remote control of the television receiver 102-23, as shown in FIG. 18. When receiving an instruction "this time only" from the user via the screen in FIG. 18, the server device 106 may determine that permission is given for transmission of an instruction to the air conditioner 102-22, which is the terminal device 102 that is the transmission destination of the instruction, without registering, with the database managed by the instruction permission information management unit, the information indicating that the coordination permission is given for the pair of the mobile telephone 102-21 and the air conditioner 102-22.

Note that the display device is not limited to a television receiver and may be any device as long as it can make an inquiry to the user and receive an instruction from the user. For example, the display device may be a non-portable device such as a refrigerator with a touch panel monitor. Alternatively, the display device may be a portable device such as a smartphone, as long as the current IP address of the portable device is the same as the current IP address of the terminal device 102 that is a candidate for the transmission destination of an instruction. Also, the display device may be the terminal device 102 that is a candidate for the transmission destination of the instruction.

(Other Modifications of Embodiments)

(1) According to Embodiments 1 to 3, the terminal information management unit 203 or 213 and the operation status management unit 204 or 214 each have a different recording medium and manage a different database. However, the present disclosure is not limited to such. For example, the terminal information management unit 203 and the operation status management unit 204 may share a single recording medium and manage the same database. Alternatively, for example, the server device 101 does not need to include both the terminal information management unit 203 and the operation status management unit 204. Instead, the server device 101 may include an information management unit having the functions of both the terminal information management unit 203 and the operation status management unit 204.

Also, in modification 2, the instruction permission information management unit, the terminal information management unit 213, and the operation status management unit 214 may share a single recording medium and manage the same database.

Alternatively, for example, the terminal information management unit 203 and the operation status management unit 204 may manage a database server external to the server device 101.

(2) According to Embodiments 2 to 3, the transmission and reception unit 211 generates the connection information. However, the present disclosure is not limited to such. For example, the terminal information management unit 213 and the operation status management unit 214 may each generate the connection information. Alternatively, each of the terminal devices 102 may generate the connection information, and transmit the connection information to the transmission and reception unit 211, along with the corresponding terminal unique information or operation status.

(3) According to Embodiments 2 to 3, the connection source IP address in the connection information is an IPv4 address. However, the present disclosure is not limited to such. For example, the connection source IP address in the connection information may be an IPv6 address. Also, instead of the connection source IP address, it is possible to use an identifier identifying whether the corresponding terminal device is under the same router as a certain terminal device.

(4) According to Embodiments 2 to 3, when the input reception unit 303 of any of the terminal devices 102 receives an instruction from the user, or when the execution unit 304 of any of the terminal devices 102 performs an operation, the terminal device 102 transmits the operation status and the terminal unique information to the server device 104 or 106. However, the present disclosure is not limited to such. For example, each of the terminal devices 102 may periodically transmit the terminal unique information and the operation status, regardless of a user instruction or whether an operation was performed by the execution unit 304. FIG. 19 shows an example setting of each terminal device 102. With the setting as shown in FIG. 19, when the transmission interval of one of the terminal devices 102 is an hour, for example, the server device 104 or 106 can always hold the terminal unique information and the operation status transmitted within an hour.

Alternatively, for example, the terminal device 102 may transmit the terminal unique information when a predetermined time period has elapsed since the last transmission of the terminal unique information. Specifically, suppose that the predetermined time period is an hour, for example. In this case, the terminal device 102 transmits the terminal unique information and the operation status to the server device 104 or 106 when the input reception unit 303 receives a user instruction or when the execution unit 304 performs an operation. Then, when an hour elapses after the transmission of the terminal unique information, the terminal device 102 transmits only the terminal unique information. As described above, while periodically transmitting the terminal unique information, the terminal device 102 transmits the operation status only when there is a change in operation status so as to refrain from unnecessary communications. This allows for a prompt update of the database managed by the terminal information management unit 213 when there is a change in the connection source IP address of the terminal device 102.

(5) According to Embodiments 2 to 3, the terminal device specification unit 216 or 226 searches for the connection information that satisfies the following conditions: the connection source IP address is the same as the connection source IP address indicated by the connection information corresponding to a specific operation status; and the connection time is within five minutes before and after the connection time indicated by the connection information corresponding to the specific operation status. However, the present disclosure is not limited to such. For example, the terminal device specification unit 216 may search for the connection information indicating the connection time that is within ten minutes before and after the connection time indicated by the connection information corresponding to the specific operation status.

Alternatively, if the terminal device 102 targeted for the search is a device that transmits the terminal unique information in a predetermined polling interval as described in the above (4), the terminal device specification unit 216 may search for the connection information indicating the connection time that is within the predetermined polling interval before and after the connection time indicated by the connection information corresponding to the specific operation status. For example, suppose that the polling interval of the air conditioner whose product code is AIRCON2012 is 30 minutes, as shown in FIG. 19. In this case, when transmitting, to the air conditioner, an instruction determined based on the operation status acquired from the IH cooking heater, the terminal device specification unit 216 may search for the terminal unique information of the air conditioner acquired within 30 minutes before and after the connection time corresponding to the operation status acquired from the IH cooking heater.

(6) According to Embodiments 2 to 3, the terminal device specification unit 216 or 226 specifies the terminal ID of the terminal device 102 that is a candidate for the transmission destination of the instruction determined by the instruction determination unit 212. However, the present disclosure is not limited to such. For example, if the instruction determination unit 212 determines an instruction that requires each of the terminal devices 102 that belong to the same terminal device group 103 to notify the operation status, the terminal device specification unit 216 may specify the terminal devices 102 without checking their product codes.

(7) According to Embodiments 2 to 3, processing is ended when the terminal device specification unit 216 or 226 determines that permission is not given for transmission of the instruction to the terminal device 102 that is a candidate for the transmission destination of the instruction. However, the present disclosure is not limited to such. For example, when determining that permission is not given for transmission of the instruction to the terminal device 102 that is a candidate for the transmission destination of the instruction, the terminal device specification unit 216 may specify the terminal device 102 that is a candidate for the transmission destination of the instruction and that has the second highest priority, and determine whether permission is given for the transmission of the instruction to the specified terminal device 102. In this way, when not being able to transmit the instruction for a coordinated operation, the server device 104 can attempt to transmit the instruction to the terminal device 102 having the second highest priority.

(8) According to Embodiments 1 to 3, and Modifications 1 and 2, the terminal device specification unit 216 or 226 specifies one of the terminal devices 102 that is a candidate for the transmission destination of the instruction. However, the present disclosure is not limited to such. For example, when not being to specify any terminal device 102 that is a candidate for the transmission destination of the instruction, and that has the highest priority, the terminal device specification unit 216 may attempt to specify the terminal device 102 that is a candidate for the transmission destination of the instruction and that has the second highest priority. In this way, when not being able to find the terminal device having the highest priority as the transmission destination of the instruction for a coordinated operation, the server device 104 can attempt to transmit the instruction to the terminal device 102 having the second highest priority.

Also, when specifying two or more terminal devices 102 that are each a candidate for the transmission destination of the instruction, the terminal device specification unit 216 may make an inquiry to the user as to which terminal device 102 to be selected as the transmission destination of the instruction. For example, suppose that a power off instruction is to be transmitted to an air conditioner, and that two or more air conditioners are located in the same home. In this case, the server device cause the display device as shown in Modification 2 to display an inquiry message as to which air conditioner should be switched off, and have the user select one of the air conditioners. Alternatively, suppose that the server device attempts to transmit a power off instruction to one of the air conditioners based on a mobile telephone, which is a portable device. In this case, the server device may make a list of the product codes of the respective air conditioners, and present the list to the user so that the user can select which air conditioner to be switched off.

(9) In Embodiment 3 and Modification 1, the terminal device specification unit 226 unlimitedly searches the database managed by the terminal information management unit 213 for a pair of (i) the terminal unique information corresponding to the operation status used by the instruction determination unit 212 to determine the instruction and (ii) the terminal unique information corresponding to the connection information that satisfies the following conditions: the connection source IP address is the same as the connection source IP address associated with the terminal unique information corresponding to the operation status used to determine the instruction; and the connection time is within a predetermined time period before and after the connection time associated with the terminal unique information corresponding to the operation status used to determine the instruction. However, the present disclosure is not limited to such. For example, the terminal device specification unit 226 may impose a limitation on the connection time in the terminal unique information, such that the connection time falls within a predetermined time period from the current time, such as within two weeks or a month. This allows for exclusion of the following devices from the search target: a portable device temporarily brought into a home; a terminal device no longer located in the home due to transfer or disposal; and so on.

(10) In Modification 2, the server device 106 specifies a display device based on the product code. However, the present disclosure is not limited to such. For example, the terminal unique information transmitted by each of the terminal devices 102 may include information indicating whether the terminal device 102 has a function of the display device, and the server device 106 may specify the display device based on the terminal unique information.

(11) In Modification 2, when coordination permission is not given, the server device 106 transmits, to the display device, an instruction for displaying an inquiry as to whether a coordinated operation is permitted. If a coordination permission is not given by the user via the display terminal device, the server device 106 does not transmit the instruction to the terminal device 102 pertaining to the inquiry. However, the present disclosure is not limited to such. For example, if the terminal device 102 corresponding to the operation status used by the instruction determination unit 212 to determine the instruction is not a portable device, the server device 106 may transmit the instruction to the terminal device that is a candidate for the transmission destination of the instruction, even when the coordination permission is not given.

Also, for example, suppose that the terminal device 102 corresponding to the operation status used by the instruction determination unit 212 to determine the instruction is a mobile telephone, which is a portable device, and that no coordination permission is given. In this case, server device 106 may cause the mobile telephone to display a screen for the user to input a preset password to remotely control the terminal device 102 that is a candidate for the transmission destination of the instruction. If the user inputs the password correctly, the server device 106 may transmit the instruction to the terminal device 102.

Also, suppose that the server device 106 transmits, to the display device, an instruction for displaying an inquiry message as to whether a coordinated operation is permitted, and receives a denial to the coordinated operation from the user via the display device. In this case, the server device 106 may register, with a blacklist, a pair of the terminal device 102 corresponding to the operation status used by the instruction determination unit 212 to determine the instruction and the terminal device 102 that is a candidate for the transmission destination of the instruction, and may not permit the pair to perform a coordinated operation.

(12) Communication channels between the terminal devices 102 and the server device 101, 104, or 106 may be rendered secure. For example, the terminal devices 102 may encrypt data to be transmitted, and the server device 101 may decrypt the data, or vice versa. Also, the server device 101 may perform challenge-response authentication with the terminal devices 102, or vice versa, or the server device 101 and the terminal devices 102 may perform bi-directional authentication.

(13) In Embodiments 1 to 3, a single device has a plurality of functions (components). However, the present disclosure is not limited to such. The functions (components) may be separated into a plurality of devices, and a combination of the devices may realize the same effects and functions as described above. For example, in Embodiment 2, the server device 104 includes the terminal information management unit 213 and the operation status management unit 214.

However, the functions of the server device 104 may be realized by a combination of a server device not including these management units 213 and 214 and a database server including these management units 213 and 214.

(14) In Embodiments 1 to 3, the function blocks of the server device may be typically realized as an Large Scale Integration (LSI). Each of the function blocks may be made into one chip individually, or may also be made into one chip so as to include at least one unit or to include a part of each unit.

The LSI may be referred to as an Integrated Circuit (IC), a system LSI, a super LSI or an ultra LSI in accordance with the degree of integration.

In addition, an integrated circuit may not necessarily be manufactured as an LSI, but may be realized by a dedicated circuit or a general-purpose processor. A Field Programmable Gate Array (FPGA), which is programmable after the LSI is manufactured, or a reconfigurable processor, which allows reconfiguration of the connection and setting of circuit cells inside the LSI, may be used.

Furthermore, if technology for forming integrated circuits that replaces LSIs emerges, owing to advances in semiconductor technology or to another derivative technology, the integration of functional blocks may naturally be accomplished using such technology.

Each of the function blocks may also be realized as software, or alternatively, as a combination of an LSI and software. Also, such software may be tamper-resistant.

(15) Part or all of the components of each of the server devices 101, 104, and 106, and of the terminal device 102 according to Embodiments 1 to 3 may be composed of a removable IC card which is removable from each of the devices or, alternatively, may be composed of a single module. The IC card or the module are each a computer system that includes a microprocessor, ROM, RAM, etc. The IC card or the module may include therein the above-mentioned ultra-multifunctional LSI. The microprocessor operates according to computer programs, and the IC card or the module thereby accomplishes its functions. The IC card or the module may be tamper resistant.

(16) The present disclosure may be the above-described method. The present disclosure may be computer programs that achieve the method by a computer or may be a digital signal composed of the computer programs.

The present disclosure may also be a computer-readable recording medium on which the digital signal or the computer programs are recorded. Examples of the computer-readable recording medium include a flexible disk, a hard disk, a CD-ROM, an MO, a DVD, a DVD-ROM, a DVD-RAM, a Blu-ray Disc (BD), and a semiconductor memory. The present disclosure may also be the digital signal recorded on such a recording medium.

Furthermore, the present disclosure may be the computer programs or the digital signal transmitted via an electric communication network, a wireless or wired communication network, a network of which the Internet is representative, a data broadcast or the like.

The present disclosure may also be a computer system including a microprocessor and a memory, the memory storing the computer programs, and the microprocessor operating in accordance with the computer programs.

Also, another independent computer system may implement the computer programs or the digital signal after the computer programs or the digital signal are transferred via being recorded on the recording medium, via one of the aforementioned networks, etc.

(17) Embodiments 1 to 3 as set forth above are merely examples of the present disclosure, and various changes and modifications may be made without departing from the scope of the present disclosure. For example, Embodiment 2 may be combined with Modification 1.

(Supplementary Remarks)

The following describes the structures and effects of a controlling method, a controlling system, and a server according to an embodiment.

(1) One aspect of the present embodiment is a terminal device controlling method used in a system that centrally manages and controls, via a network, a terminal device group composed of a plurality of terminal devices in a home, the system including an information acquisition unit, an information management unit, an instruction determination unit, a terminal device specification unit, and an instruction transmission unit, the controlling method comprising: an information acquisition step, by the information acquisition unit, of acquiring, from each of the terminal devices, an operation status and terminal unique information identifying the terminal device; an information management step, by the information management unit, of managing, for each of the terminal devices, the operation status, the terminal unique information, connection source information, and acquisition time in association with each other, the connection source information specifying, in the network, the terminal device from which the operation status and the terminal unique information have been acquired, and the acquisition time indicating time at which the operation status and the terminal unique information have been acquired; an instruction determination step, by the instruction determination unit, of determining an instruction for causing one of the terminal devices to perform an operation according to the operation status acquired from a different one of the terminal devices; a terminal device specification step, by the terminal device specification unit, of specifying, from among the terminal devices, a terminal device as a transmission destination of the instruction, the terminal device being identified by the terminal unique information corresponding to the same connection source information as the connection source information that is associated with the operation status acquired from the different terminal device, and that has been acquired within a predetermined time period before and after the acquisition time associated with the operation status acquired from the different terminal device; and an instruction transmission step, by the instruction transmission unit, of transmitting the instruction to the specified terminal device.

Another aspect of the present embodiment is a system that centrally manages and controls, via a network, a terminal device group composed of a plurality of terminal devices in a home, the system comprising: an information acquisition unit configured to acquire, from each of the terminal devices, an operation status and terminal unique information identifying the terminal device; an information management unit configured to manage, for each of the terminal devices, the operation status, the terminal unique information, connection source information, and acquisition time in association with each other, the connection source information specifying, in the network, the terminal device from which the operation status and the terminal unique information have been acquired, and the acquisition time indicating time at which the operation status and the terminal unique information have been acquired; an instruction determination unit configured to determine an instruction for causing one of the terminal devices to perform an operation according to the operation status acquired from a different one of the terminal devices; a terminal device specification unit configured to specify, from among the terminal devices, a terminal device as a transmission destination of the instruction, the terminal device being identified by the terminal unique information corresponding to the same connection source information as the connection source information that is associated with the operation status acquired from the different terminal device, and that has been acquired within a predetermined time period before and after the acquisition time associated with the operation status acquired from the different terminal device; and an instruction transmission unit configured to transmit the instruction to the specified terminal device.

Yet another aspect of the present embodiment is a server device that centrally manages and controls, via a network, a terminal device group composed of a plurality of terminal devices in a home, the server device comprising: an information acquisition unit configured to acquire, from each of the terminal devices, an operation status and terminal unique information identifying the terminal device; an information management unit configured to manage, for each of the terminal devices, the operation status, the terminal unique information, connection source information, and acquisition time in association with each other, the connection source information specifying, in the network, the terminal device from which the operation status and the terminal unique information have been acquired, and the acquisition time indicating time at which the operation status and the terminal unique information have been acquired; an instruction determination unit configured to determine an instruction for causing one of the terminal devices to perform an operation according to the operation status acquired from a different one of the terminal devices; a terminal device specification unit configured to specify, from among the terminal devices, a terminal device as a transmission destination of the instruction, the terminal device being identified by the terminal unique information corresponding to the same connection source information as the connection source information that is associated with the operation status acquired from the different terminal device, and that has been acquired within a predetermined time period before and after the acquisition time associated with the operation status acquired from the different terminal device; and an instruction transmission unit configured to transmit the instruction to the specified terminal device.

This realizes a terminal control system having the following functions: manage a terminal device group composed of a plurality of terminal devices in a home; acquire an operation status from one of the terminal devices; specify a different one of the terminal devices in the same home; and cause the different terminal device thus specified to perform an operation according to the operation status acquired from the one terminal device.

(2) In the method described in the item (1) above, the terminal unique information of each of the terminal devices may further include type information indicating a type of the terminal device, the instruction determination step may further determine the type of the terminal device to which the instruction is to be transmitted, and the terminal unique information of the terminal device specified in the terminal device specification step may include the type information indicating the type determined by the instruction determination step.

This makes it possible to determine instructions according to the functions of the respective terminal devices, and to cause one of the terminal devices to perform an operation suitable to the situation.

(3) In the method described in the item (2) above, the system may further include a portable device determination unit, the controlling method may further comprise a portable device determination step, by the portable device determination unit, of determining, based on the type information of each of the terminal devices, whether the terminal device is a portable device used inside and outside the home, the information acquisition step may acquire a plurality of operation statuses from each of the terminal devices, when the portable device determination step determines that the different terminal device is a portable device, the terminal device specification step may use, as the operation status acquired from the different terminal device, one of the operation statuses acquired from the different terminal device, and when the portable device determination step determines that the different terminal device is not a portable device, the terminal device specification step may use, as the operation status acquired from the different terminal device, the latest operation status from among the operation statuses acquired from the different terminal device.

In this way, even when the terminal device corresponding to the operation status used for the determination of the instruction is a portable device and the portable device is carried outside the home, the terminal device as the transmission destination of the instruction can still be specified with use of the connection source information corresponding to the time when the portable device was inside the home. This makes it possible to cause the specified terminal device to perform an operation according to the operation status acquired from the portable device. Also, in a case where a terminal device is caused to perform an operation according to an operation status acquired from a non-portable device, it is possible to reduce the load of the search processing for specifying the terminal device.

(4) In the method described in the item (2) above, the system may further include a portable device determination unit, the controlling method may further comprise a portable device determination step, by the portable device determination unit, of determining, based on the type information of each of the terminal devices, whether the terminal device is a portable device used inside and outside the home, the information acquisition step may acquire, from each of the terminal devices, a plurality of operation statuses and a plurality of pieces of terminal unique information identifying the terminal device, the information management step may manage the operation statuses, the pieces of terminal unique information, and a plurality of pieces of connection source information in one-to-one association with each other, each of the pieces of connection source information specifying, in the network, the terminal device from which the corresponding operation status and the corresponding piece of terminal unique information have been acquired, the terminal device specification step may use, as the operation status acquired from the different terminal device, one of the operation statuses acquired from the different terminal device, and when the portable device determination step determines that the specified terminal device is a portable device, the instruction transmission step may transmit the instruction to the specified terminal device with use of the latest connection source information from among all pieces of the connection source information associated with the respective pieces of terminal unique information of the specified terminal device.

In this way, when the terminal device as the transmission destination of the instruction is a portable device, the portable device can be specified with use of the terminal unique information corresponding to the time when the portable terminal device was inside the home. As a result, even when the portable device is carried outside the home, the portable device can be caused to perform an operation according to the operation status acquired from a terminal device inside the home.

(5) In the method described in the item (1) above, the instruction to be transmitted to the specified terminal device may be either an instruction to be executed by the specified terminal device or an instruction for causing the specified terminal device to acquire and execute a program.

This makes it possible to cause a terminal device to perform a specific operation or to cause a terminal device to update an internal program thereof.

(6) In the method described in the item (1) above, the operation status acquired from each of the terminal devices may be any of an operation instruction received by the terminal device from a user, environment information acquired as a result of an operation by the terminal device, or an operation performed by the terminal device.

This makes it possible to cause a terminal device to perform an operation in coordination with an operation performed by another terminal device. This also makes it possible to cause an appropriate terminal device to execute a user instruction received by another terminal device.

(7) In the method described in the item (1) above, each of the terminal devices may transmit a plurality of operation statuses and a plurality of pieces of terminal unique information identifying the terminal device at predetermined intervals, and the information acquisition step may acquire the operation statuses and the pieces of terminal unique information from the terminal devices.

In this way, the information acquisition step can reliably acquire the pieces of terminal unique information and the operation statuses from each of the terminal devices over time.

(8) In the method described in the item (1) above, each of the terminal devices may transmit an operation status and terminal unique information identifying the terminal device, every time the operation status changes, and the information acquisition step may acquire the operation status and the terminal unique information from each of the terminal devices.

In this way, each of the terminal devices can transmit the operation status as necessary. This eliminates unnecessary communications, and, when there is a change in an operation status, the terminal device corresponding to the operation status can promptly transmit the operation status.

(9) In the method described in the item (8) above, each of the terminal devices may transmit terminal unique information identifying the terminal device, after a predetermined time interval elapses since the last transmission of terminal unique information identifying the terminal device.

In this way, each of the terminal devices can promptly transmit the operation status as necessary. Also, each of the terminal devices periodically updates the connection source information, so that when there is a change in the connection source information, the terminal device can promptly reflect the change in the system.

(10) In the method described in the item (1) above, at least one of the terminal devices may be a display device having a display and an input unit, the information management step may further manage coordination permission for each pair of one of the terminal devices and a different one of the terminal devices, the coordination permission indicating whether the one terminal device is permitted to perform an operation according to the operation status acquired from the different terminal device, when no coordination permission is given to a pair of one of the terminal devices and a different one of the terminal devices, the instruction transmission step may make an inquiry to a user as to whether the one terminal device is permitted to perform an operation according to the operation status acquired from the different terminal device, the inquiry being made with use of the display of the display device before transmission of an instruction to the one terminal device, and, only when receiving, from the input unit of the display device, a notification indicating that the user has permitted the transmission of the instruction, the instruction transmission step may cause the information management step to manage the coordination permission for the one terminal device and the different terminal device and may transmit the instruction to the one terminal device.

In this way, when a terminal device of the user is to be caused to perform a coordinated operation with another terminal device for the first time, an inquiry is made to the user as to whether the coordinated operation is permitted. This prevents the terminal device of the user from accidentally performing a coordinated operation with an irrelevant terminal device that belongs to another user.

A terminal control system according to the present disclosure collects information from a terminal device group and analyzes the information with use of the terminal device group and a server device. The terminal device group is composed of a plurality of terminal devices owned by a user. The server device manages these terminal devices as the terminal group. The terminal control system causes the terminal device group or part of the terminal device group to perform a coordinated operation so as to provide the user with new user-friendly functions and services. The terminal control system is useful in business relating to server devices and terminal devices.

REFERENCE SIGNS LIST 101, 104, 106 server device
102 terminal device
103 terminal device group
201, 211 transmission and reception unit
202, 212 instruction determination unit
203, 213 terminal information management unit
204, 214 operation status management unit
205, 215, 225 control unit
216, 226 terminal device specification unit
227 portable device determination unit
301 transmission and reception unit
302 terminal information holding unit
303 input and reception unit
304 execution unit
305 control unit

What is claimed is:

1. A controlling method used in a system that centrally manages and controls a plurality of terminal devices via a network, the controlling method comprising:
an information acquisition step of acquiring, from each of the plurality of terminal devices, an operation status and a terminal ID;
an information management step of managing, for each of the plurality of terminal devices, the operation status and the terminal ID having been acquired in association with a global IP address via which the operation status and the terminal ID have been acquired and an acquisition time at which the operation status and the terminal ID have been acquired;

a terminal device specification step of specifying, from among the plurality of terminal devices, a first terminal device having the same global IP address as a second terminal device among the plurality of terminal devices and having the terminal ID associated with a first acquisition time within a predetermined time range of a second acquisition time for the second terminal device;

an instruction determination step of determining an instruction to be executed by the first terminal device based on the operation status associated with the second terminal device having been acquired from the second terminal device when the first terminal device has the same global IP address as the second terminal device and an instruction transmission step of transmitting the instruction to the first terminal device.

2. The controlling method of claim 1, wherein from each of the plurality of terminal devices, the information acquisition step further acquires a product code, for each of the plurality of terminal devices, the information management step manages an operation status, a terminal ID, and a product code having been acquired in association with a global IP address via which the operation status, the terminal ID, and the product code have been acquired and an acquisition time at which the operation status, the terminal ID, and the product code have been acquired, and the terminal device specification step specifies, as the first terminal device, a terminal device, among the plurality of terminal devices, having the same global IP address as the second terminal device, and having the terminal ID and product code terminal ID associated with the first acquisition time within the predetermined time range of the second acquisition time for the second terminal device.

3. The controlling method of claim 2, further comprising a portable device determination step of determining, based on a product code having been acquired from the second terminal device, whether the second terminal device is a portable device, wherein when the portable device determination step determines that the second terminal device is a portable device, the terminal device specification step specifies, as the first terminal device, a terminal device, among the plurality of terminal devices, having the same global IP address as the second terminal device and having the terminal ID and product code associated with the first acquisition time within the predetermined time range of the second acquisition time for the second terminal device.

4. The controlling method of claim 2, further comprising a portable device determination step of determining, based on a product code having been acquired from the first terminal device, whether the first terminal device is a portable device, wherein the terminal device specification step specifies, as the first terminal device, a terminal device, among the plurality of terminal devices, having the same global IP address as the second terminal device and having the terminal ID and product code terminal ID associated with the first acquisition time within the predetermined time range of the second acquisition time for the second terminal device, and when the portable device determination step determines that the first terminal device is a portable device, the instruction transmission step transmits the instruction to the first terminal device via a most recently acquired global IP addresses of the first terminal device.

5. The controlling method of claim 1, wherein the instruction is either an instruction causing the first terminal device to execute an operation or an instruction causing the first terminal device to acquire and execute a program.

6. The controlling method of claim 1, wherein the operation status of the second terminal device indicates either an operation instruction that the second terminal device has received from a user, environment information that the second terminal device has acquired, or an operation that the second terminal device has executed.

7. The controlling method of claim 1, wherein for each of the plurality of terminal devices, the information acquisition step performs the acquisition of the operation status and the terminal ID each time a predetermined time period, uniquely set with respect to each of the plurality of terminal devices, elapses.

8. The controlling method of claim 1, wherein for each of the plurality of terminal devices, the information acquisition step performs the acquisition of the operation status and the terminal ID each time there is a change in operation status.

9. The controlling method of claim 1, wherein for each of the plurality of terminal devices, the information acquisition step performs the acquisition of the terminal ID each time a predetermined time period elapses.

10. The controlling method of claim 1, wherein the information management step further manages coordination permission information indicating whether the first terminal device can be caused to operate based on the operation status of the second terminal device, and when the coordination permission information indicates that the first terminal device cannot be caused to operate based on the operation status having been acquired from the second terminal device, the instruction transmission step makes a request for permission to cause the first terminal to operate before transmitting the instruction to the first terminal device, and transmits the instruction to the first terminal device only when the permission to cause the first terminal to operate is granted.

11. The controlling method of claim 1, wherein when the global IP address is specified to be the same as a global IP address of the second terminal device, the first terminal device and the second terminal device are determined to be located in a same household.

12. The controlling method of claim 11, wherein the system is located external to a household in which the first terminal and second terminal are located.

13. The controlling method of claim 12, wherein the plurality of terminal devices being centrally managed and controlled by the system are located in a plurality of households and the system is located external to the plurality of households.

14. A system that centrally manages and controls a plurality of terminal devices via a network, the system comprising:

a non-transitory memory storing a program; and a hardware processor configured to execute the program so that the system operates as:

an information acquisition unit acquiring, from each of the plurality of terminal devices, an operation status and a terminal ID;

an information management unit managing, for each of the plurality of terminal devices, the operation status and the terminal ID having been acquired in association with a global IP address via which the operation status and the terminal ID have been acquired and an acquisition time at which the operation status and the terminal ID have been acquired;

a terminal device specification unit specifying, from among the plurality of terminal devices, a first terminal device having the same global IP address as a second terminal device among the plurality of terminal devices and having the terminal ID associated with a first acquisition time within a predetermined time range of a second acquisition time for the second terminal device;

an instruction determination unit determining an instruction to be executed by the first terminal device based on the operation status associated with the second terminal device having been acquired from the second terminal device when the first terminal device has the same global IP address as the second terminal device; and an instruction transmission unit transmitting the instruction to the first terminal device.

15. A controlling method used in a system that centrally manages and controls a plurality of terminal devices via a network, the controlling method comprising:

acquiring, from each of the plurality of terminal devices, an operation status and a terminal ID;

managing, for each of the plurality of terminal devices, the operation status and the terminal ID having been acquired in association with a global IP address via which the operation status and the terminal ID have been acquired and an acquisition time at which the operation status and the terminal ID have been acquired;

specifying, from among the plurality of terminal devices, a first terminal device having the same global IP address as a second terminal device among the plurality of terminal devices and having the terminal ID associated with a first acquisition time within a predetermined time range of a second acquisition time for the second terminal device;

determining an instruction to be executed by the first terminal device based on the operation status associated with the second terminal device having been acquired from the second terminal device when the first terminal device has the same global IP address as the second terminal device; and transmitting the instruction to the first terminal device.

* * * * *